US012738175B2

(12) United States Patent
Ulasen et al.

(10) Patent No.: US 12,738,175 B2
(45) Date of Patent: Sep. 15, 2026

(54) SYSTEMS AND METHODS FOR PROCTORING AND UPDATING COURSES USING MACHINE LEARNING

(71) Applicants: Constructor Technology AG, Schaffhausen (CH); Constructor Education and Research Genossenschaft, Schaffhausen (CH)

(72) Inventors: Sergey Ulasen, Singapore (SG); Andrey Adaschik, Istanbul (TR); Ilya Baimetov, Redmond, WA (US); Alexander Tormasov, Busingen am Hochrhein (DE); Serg Bell, Singapore (SG); Stanislav Protasov, Singapore (SG); Nikolay Dobrovolskiy, Alanya (TR); Laurent Dedenis, Singapore (SG)

(73) Assignee: Constructor Technology AG, Schaffhausen (CH)

( * ) Notice: Subject to any disclaimer, the term of this patent is extended or adjusted under 35 U.S.C. 154(b) by 0 days.

(21) Appl. No.: 18/895,748

(22) Filed: Sep. 25, 2024

(65) Prior Publication Data

US 2026/0087937 A1 Mar. 26, 2026

(51) Int. Cl.
*G09B 7/08* (2006.01)

(52) U.S. Cl.
CPC .................................... *G09B 7/08* (2013.01)

(58) Field of Classification Search
CPC ...................................................... G09B 7/08
See application file for complete search history.

(56) References Cited

U.S. PATENT DOCUMENTS 9,870,713 B1* 1/2018 Ducrou .................... G09B 5/08
2016/0217701 A1* 7/2016 Brown .................... G09B 7/00
2016/0314699 A1* 10/2016 Brinton .................... G09B 7/00
2018/0261118 A1* 9/2018 Morris .................... G09B 5/12
2019/0147760 A1* 5/2019 Bruckner .............. G06N 20/00
706/11
2020/0357296 A1* 11/2020 Sharma ............. G06Q 50/2057
2022/0351633 A1* 11/2022 Carroll .................... G09B 5/06
(Continued)

*Primary Examiner* — Kang Hu
*Assistant Examiner* — Correll T French
(74) *Attorney, Agent, or Firm* — ArentFox Schiff LLP; Michael Fainberg

(57) ABSTRACT

Disclosed herein are systems and methods for updating a graphical user interface displaying content related to a topic based on user performance. A method may include: receiving, via a user interface (UI), a user selection of a topic; generating, using a machine learning algorithm, a course from reference materials describing a plurality of sub-topics associated with the topic, wherein the machine learning algorithm includes, in the course, a plurality of assessments that test comprehension of the plurality of sub-topics; outputting the course on the UI; monitoring user interaction with a first subset of the assessments within the course on the UI; in response to determining, based on the monitoring, that the user interaction does not meet a comprehension criteria, modifying, using the machine learning algorithm, a first subset of the sub-topics corresponding to the first subset of the assessments; and outputting the modified course on the UI.

20 Claims, 12 Drawing Sheets

(56) References Cited

U.S. PATENT DOCUMENTS

2023/0185811 A1* 6/2023 Basilio .................... G09B 5/00
707/732
2023/0282133 A1* 9/2023 DiMauro .............. G09B 23/02
434/188

* cited by examiner

SYSTEMS AND METHODS FOR PROCTORING AND UPDATING COURSES USING MACHINE LEARNING

FIELD OF TECHNOLOGY

The present disclosure relates to the field of machine learning, and, more specifically, to systems and methods for proctoring and updating courses using machine learning.

BACKGROUND

Traditional graphical user interfaces (GUIs) have long served as the primary means of presenting educational content, attempting to bridge the gap between information and learners. However, the shortcomings of conventional GUIs in effectively displaying educational content have become increasingly evident. As the demand for dynamic and engaging learning experiences rises, these interfaces often struggle to provide the necessary flexibility, interactivity, and adaptability required to meet the diverse needs of modern learners. In this era of digital education, the limitations of conventional GUIs hinder the seamless delivery of educational material, impeding the potential for enhanced comprehension and retention.

From a computer perspective, conventional graphical user interfaces (GUIs) encounter several deficiencies when attempting to display educational content effectively. These limitations stem from the inherent design principles and constraints associated with traditional interfaces. For example, traditional GUIs are often static, presenting educational content in a fixed format. This lack of dynamism limits the adaptability of interfaces to diverse learning styles and inhibits the seamless integration of media elements.

Most conventional GUIs offer limited interactivity. Learners are often confined to passive consumption of content, with minimal opportunities for active engagement. Navigation within traditional GUIs may become cumbersome when dealing with extensive educational content. Cumbersome navigation impedes the fluid movement between sections, hindering users from quickly accessing relevant information. For example, several relevant pieces of information and options are often hidden behind menus and involve sub-optimal interaction to reach.

Furthermore, a software-based education system that does not adapt its user interface based on student performance fails to efficiently teach its users. This is due to its inability to personalize learning experiences. Without adaptation, the system overlooks individual learning styles, strengths, and weaknesses, hindering students' ability to grasp concepts effectively. This lack of personalization also means that miscomprehensions go unaddressed, leading to gaps in understanding. Furthermore, students may become demotivated or disengaged if the material is either too easy or too challenging, as the system fails to provide appropriate levels of challenge and support. Timely feedback, essential for learning, is also compromised, as the system may provide generic feedback or none at all. Inefficient resource allocation further exacerbates the problem, potentially wasting valuable time and resources. Overall, without adapting to student performance, the software-based education system falls short in fostering meaningful learning experiences and achieving optimal learning outcomes.

SUMMARY

In one exemplary aspect, the techniques described herein relate to a method for updating a graphical user interface displaying content related to a topic based on user performance, the method including: receiving, via a graphical user interface (GUI), a user selection of a topic; generating, using a machine learning algorithm, a course from reference materials describing a plurality of sub-topics associated with the topic, wherein the machine learning algorithm includes, in the course, a plurality of assessments that test comprehension of the plurality of sub-topics; outputting the course on the GUI; monitoring user interaction with a first subset of the assessments within the course on the GUI; in response to determining, based on the monitoring, that the user interaction does not meet a comprehension criteria, modifying, using the machine learning algorithm, a first subset of the sub-topics corresponding to the first subset of the assessments; and outputting the modified course on the GUI.

In some aspects, the techniques described herein relate to a method, wherein determining whether the user interaction meets the comprehension criteria includes: extracting a plurality of attributes associated with the user interaction; and executing another machine learning algorithm trained to classify whether the comprehension criteria has been met based on the plurality of attributes.

In some aspects, the techniques described herein relate to a method, wherein the plurality of attributes includes one or more of: student feedback, total score per assessment, scores per question type in an assessment, time spent to complete an assessment, time spent to provide a response within an assessment, and a number of attempts to provide the response, answer choice changes, a time spent between the answer choice changes, usage of prompts and hints.

In some aspects, the techniques described herein relate to a method, wherein an attribute of the plurality of attributes is a cheating probability, further including: executing a different machine learning algorithm configured to compare a student response to a database of responses to detect plagiarism, and compare student scores to historical student scores to detect score anomalies, wherein the different machine learning algorithm outputs the cheating probability.

In some aspects, the techniques described herein relate to a method, further including: modifying, using the machine learning algorithm, a second subset of the sub-topics that do not correspond to the first subset of the assessments.

In some aspects, the techniques described herein relate to a method, wherein modifying the first subset of the sub-topics includes: adding content from additional reference materials into the course, wherein the additional reference materials explain the first subset of the sub-topics.

In some aspects, the techniques described herein relate to a method, wherein modifying the first subset of the sub-topics includes: adding alternative content from the reference materials into the course, wherein the alternative content elaborates on the first subset of the sub-topics.

In some aspects, the techniques described herein relate to a method, wherein modifying the first subset of the sub-topics includes: reducing, by a first amount, content associated with the first subset of the sub-topics from the course; and adding, by the first amount, the alternative content to the course.

In some aspects, the techniques described herein relate to a method, wherein reducing the content includes: ranking text in the content associated with the first subset of the sub-topics; and removing any text from the course with a rank less than a threshold text rank.

In some aspects, the techniques described herein relate to a method, wherein modifying the first subset of the sub-topics includes: replacing the first subset of the assessments with alternative assessments with a lower difficulty than the first subset of the assessments.

In some aspects, the techniques described herein relate to a method, wherein generating the course further includes: retrieving content associated with the topic from a database of reference materials, wherein the content includes text and visuals from the reference materials; outputting the course on the GUI in a default organization scheme; determining an amount of time needed by a user to consume the content in the default organization scheme; and automatically updating the content displayed in the GUI in accordance with a custom organizational scheme by: adding additional content to the content when the amount of time is less than a preferred duration; and filtering out existing content from the content when the amount of time is greater than the preferred duration.

In some aspects, the techniques described herein relate to a method, wherein automatically updating the content displayed in the GUI in accordance with the custom organizational scheme includes: executing a first machine learning algorithm trained to generate, for an input duration, a word limit of text in the content, a media limit of graphics in content, and an assessment limit of questions in the content; and executing a second machine learning algorithm trained to summarize the reference materials into the content including an updated amount of text capped at the word limit, an updated amount of graphics capped at the media limit, and an updated amount of questions capped at the assessment limit.

It should be noted that the methods described above may be implemented in a system comprising a hardware processor. Alternatively, the methods may be implemented using computer executable instructions of a non-transitory computer readable medium.

In some aspects, the techniques described herein relate to a system for updating a graphical user interface displaying content related to a topic based on user performance, including: at least one memory; at least one hardware processor coupled with the at least one memory and configured, individually or in combination, to: receive, via a graphical user interface (GUI), a user selection of a topic; generate, using a machine learning algorithm, a course from reference materials describing a plurality of sub-topics associated with the topic, wherein the machine learning algorithm includes, in the course, a plurality of assessments that test comprehension of the plurality of sub-topics; output the course on the GUI; monitor user interaction with a first subset of the assessments within the course on the GUI; in response to determining, based on the monitoring, that the user interaction does not meet a comprehension criteria, modify, using the machine learning algorithm, a first subset of the sub-topics corresponding to the first subset of the assessments; and output the modified course on the GUI.

In some aspects, the techniques described herein relate to a non-transitory computer readable medium storing thereon computer executable instructions for updating a graphical user interface displaying content related to a topic based on user performance, including instructions for: receiving, via a graphical user interface (GUI), a user selection of a topic; generating, using a machine learning algorithm, a course from reference materials describing a plurality of sub-topics associated with the topic, wherein the machine learning algorithm includes, in the course, a plurality of assessments that test comprehension of the plurality of sub-topics; outputting the course on the GUI; monitoring user interaction with a first subset of the assessments within the course on the GUI; in response to determining, based on the monitoring, that the user interaction does not meet a comprehension criteria, modifying, using the machine learning algorithm, a first subset of the sub-topics corresponding to the first subset of the assessments; and outputting the modified course on the GUI.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for generating custom courses on a graphical user interface (GUI) using machine learning. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure describes the generation of custom courses using machine learning. More specifically, the present disclosure describes how the custom courses can be updated and tailor made for each individual student using a proctoring system (used interchangeably with "performance monitor"). An exemplary proctoring system monitors the activity of students, audience involvement in a course, degree of understanding, etc., and allows students to give feedback to the teacher. Certain inputs that the proctoring system may consider include, but are not limited to, total score per assignment, score per question, time per answer, number of attempts, confidence in the answers within one subtopic, and cheating probability (e.g., proctoring score, AI answers detection, plagiarism).

The proctoring system further identifies students who need to be further questioned or tested, and automatically identifies if a student does not understand the material in order to repeat some parts of the course or generate additional materials (e.g., slides, graphs, questions, etc.). The proctoring system may also alternatively, speed up or skip some subtopics.

The system may also automatically generate various homework, tests, and quizzes for students, and evaluate and grade their answers (both multiple choice and written answers) in accordance with a grading or assessment policy, which assesses how timely the answers are provided, how qualitative they are, etc. Based on this assessment, the system may automatically determine if the student is qualified to proceed to the next part of the course or to the next course in the program. The use of the system normalizes grading differences of different teachers who teach the same course to assure uniform grading of all students.

Figure 1:
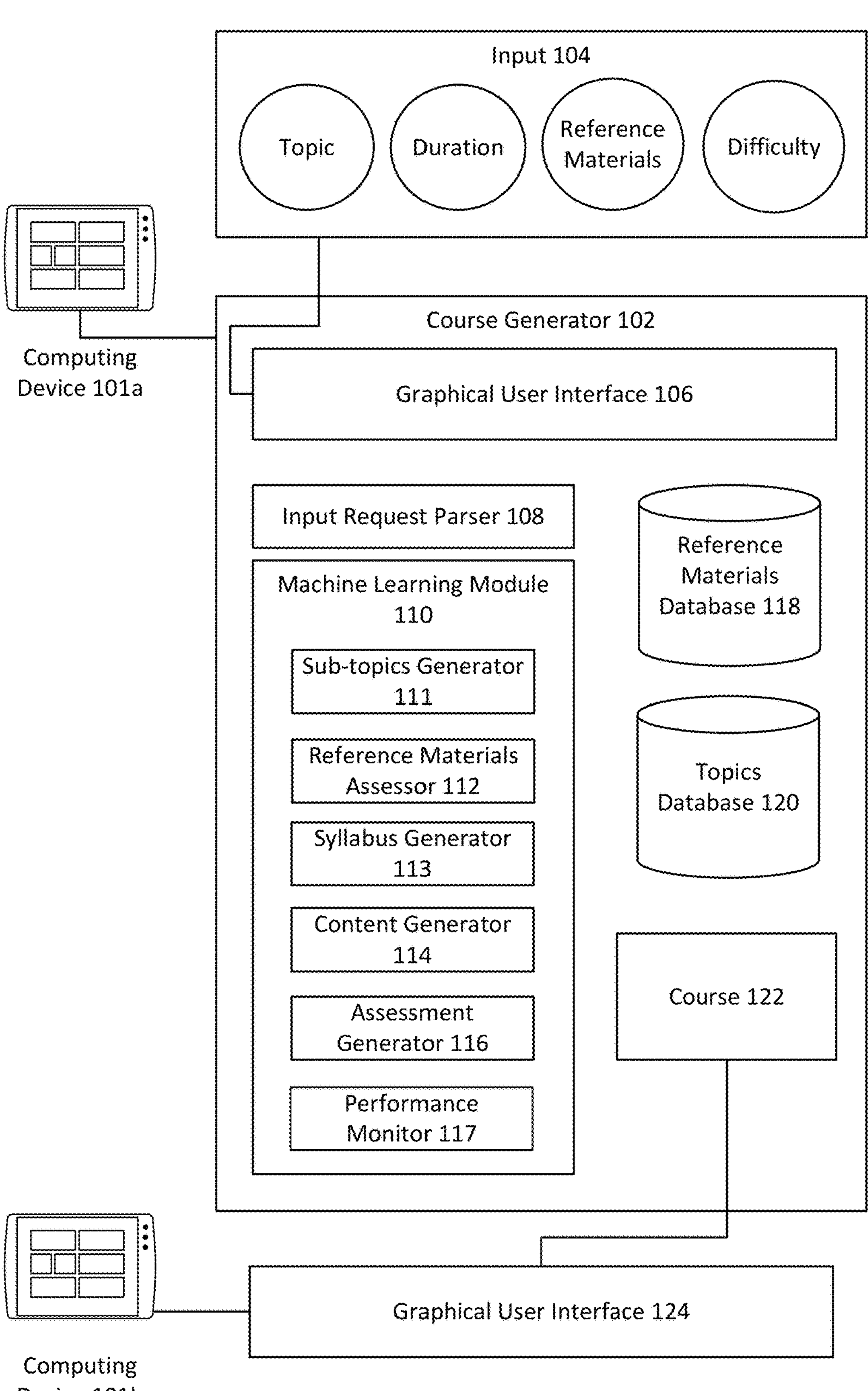
FIG. 1 is a block diagram illustrating a system for generating custom courses on a graphical user interface (GUI) using machine learning.

FIG. 1 is a block diagram illustrating system 100 for generating custom courses on a GUI using machine learning. In particular, system 100 features course generator 102, which may be a software installed on or accessed (e.g., via a virtual machine, container, web application) on computing device 101*a*. Course generator 102 includes a GUI 106, which is described in FIGS. 2-5, input request parser 108, machine learning module 110, reference materials database 118, and topics database 120. Course generator 102 is configured to generate course 122 for display on GUI 106. In some aspects, course generator 102 may transmit course 122 to graphical user interface (GUI) 124, which is part of a client application associated with course generator 102. GUI 124 may be generated by computing device 101*b*. For example, computing device 101*a* may be a device belonging to an educator (e.g., a teacher, a tutor, etc.) and computing device 101*b* may be a device belonging to a student that is taught by the educator. Alternatively, course 122 may be generated by a student on GUI 106 for self-learning. In some aspects, GUI 106 may be a text interface (e.g., a terminal, command line interface (CLI), chat interface, etc.).

The present disclosure discusses the use of artificial intelligence (AI) (e.g., large language models (LLM)) to create courses for teachers. For example, a teacher may indicate a topic (e.g., introduction to physics) and duration (e.g., 30 hours) of the course and may provide third party materials (e.g., textbooks, scientific papers, presentations, videos, media, etc.) to include in the course using GUI 106. Machine learning module 110 comprising one or more machine learning models (e.g., sub-topics generator 111, reference materials assessor 112, syllabus generator 113, content generator 114, assessment generator 116, and performance monitor 117) may analyze the user specified sources, as well as other known sources (e.g., stored in reference materials database 118), to generate a syllabus for the course that includes various topics and subtopics. The machine learning module may further fill each lesson of the course with content generated based on the AI analysis of the source materials. All this may be assembled into a book or multiple slide presentations, which serve as the output of the machine learning module 110.

In some aspects, course generator 102 uses a 3-step generation of the course. First, course generator 102 generates a syllabus, which is a organization scheme providing a course's structure, using an LLM that receives a description, reference materials, and other instructions from the user. The course structure includes topics, concepts (used interchangeably with sub-topics), and activities (used interchangeably with assessments). Second, course generator 102 enables the user to revise and edit the syllabus. Lastly, course generator 102 generates content for the course (e.g., including learning activities for each sub-topic).

In some aspects, course generator 102 receives, from the user, a description of the course (e.g., one or more of a title, a course syllabus, learning outcomes, duration, and other parameters/criteria). Course generator 102 may also receive, from the user, external source materials for course generation (e.g., books, articles, presentations, lectures, multimedia, etc.). Course generator 102 may even receive, from the user, additional instructions for fine-tuning an LLM of machine learning module 110 such as rules for creation of the course (e.g., paraphrase external materials or use direct quotes, add homework or quiz after each lecture, example of materials that LLM should use to generate the course, but not use in the course, such as user's old lectures/courses that show the preferred structure of feel of the course, but whose contents should not be used in the new course).

Course generator 102 is very interactive, proactive, iterative. For example, course generator 102 periodically/continuously offers the user ways to improve the course and does not wait for the user to ask it to do something or ask questions. Course generator 102 analyzes user-provided materials using an LLM, checks an accuracy of external materials, whether the materials are up-to-date, checks the authenticity/trustworthiness of the external materials, checks for the lack of inconsistencies between materials, and checks levels of complexity/depth/quality of external materials. Course generator 102 then generates the course using an LLM by extracting topics/concepts/activities from external materials, and generating learning outcomes or presentations, dividing the course into lectures based on user instructions (e.g., typical course includes of 15-20 lectures). Course generator 102 further outputs a course structure including a syllabus with topics, and for each topic, a set of concepts covered by the given topic and learning activities or placeholders for learning activities, which can be later filled with actual learning activities (e.g., homework, quizzes, tests, projects, etc.). Course generator 102 may further suggest to the user various learning activities for the course. It should be noted that, unlike artificial-intelligence chatbots, course generator 102 generates a course structure and then interactively suggests to the user how to fill it with various content extracted from external materials provided by the user and based on instructions specified by the user. This provides a greater level of customization to the course and improves its quality.

In an exemplary aspect, course generator 102 populates topics database 120. Topics database 120 includes a plurality of topics (e.g., "biology," "chemistry," "physics," etc.), each of which include a plurality of sub-topics. For example, the user may provide a plurality of reference materials to course generator 102. Reference materials include, but are not limited to, textbooks, non-fiction books, webpages, e-books, videos, graphics, research papers, patents, etc. In some aspects, the user may provide, to course generator 102, a copy of the reference material(s) or may provide links to the reference material(s) for course generator 102 to web crawl. The user may label the reference materials as part of a topic. For example, the user may type in a topic in GUI 106, and upload reference materials (see FIG. 2B). All provided reference materials are stored in reference materials database 118.

Given a set of reference materials for the topic, machine learning module 110 is configured to identify various sub-topics of the topic. For example, if the topic is "poetry," a sub-topic may be a particular type of poetry or a famous poet. In order to identify the sub-topics, course generator 102 may refer to the chapter titles of the reference materials (e.g., video names, slide titles, textbook chapter titles, etc.) and identify each unique title as a sub-topic. In another approach, sub-topics generator 111 of machine learning module 110 may be used to execute an algorithm such as Latent Dirichlet Allocation (LDA).

In some aspects, input request parser 108 may clean the provided/linked text data by removing stop words, punctuation, and irrelevant characters. Input request parser 108 may further break down the cleaned text into individual words or tokens. This step prepares the data for analysis on a word level. Sub-topics generator 111 may then create a document term matrix (DTM) that represents the frequency of each term (word) in each document (e.g., textbook, webpage, etc.). Each row of the DTM may correspond to a document, and each column may correspond to a unique term, with the matrix cells including the frequency of each term in the respective document. Sub-topics generator 111 may then apply the LDA algorithm to the DTM. LDA assumes that each document is a mixture of sub-topics, and each sub-topic is a mixture of words. The algorithm iteratively assigns words to sub-topics based on the distribution of topics across documents. Furthermore, sub-topics generator 111 assigns each document a probability distribution over topics, and each word is assigned to a specific sub-topic with a certain probability. Sub-topics generator 111 may identify the most probable sub-topics for each document based on the assigned probabilities. This step involves looking at the words with the highest probability in each sub-topic and interpreting them to label the sub-topics.

Using the method described above, sub-topics generator 111 is able to identify the most common words in each topic/subtopic. Said words are stored in a glossary of the topic, which is further recorded in topics database 120. In particular, the glossary indicates multiple words and a weight of each word. The weight of the word may be determined based on a frequency at which each word appears in the reference materials. For example, for a sub-topic such as "photosynthesis" in the topic "biology," terms such as "sunlight" and "carbon dioxide," which appear frequently in relation to "photosynthesis" in the reference materials may be weighted higher than "night," and "hydrogen," which appear less frequently. For example, the weight of "sunlight" may be 1.1, while the weight of "night" may be 0.2. This suggests that in a summary, the words with higher weights should be preferred for inclusion than words with lower weights. This may be because less common words are probably specific to one textbook or niche ideas.

Reference materials assessor 112 of machine learning module 110 may also be configured to assign a quality level to each reference material in reference materials database 118. A quality level represents a reliability and general preference of a textbook as expressed in a quantitative value. For example, a university level textbook on "biology" may be a high quality material, where as a fiction novel about "biology" may be a low quality material. Assessing the quality of multiple reference materials using machine learning involves defining and extracting features that represent various aspects of a material's quality. Reference materials assessor 112 may define objective metrics (e.g., readability scores, grammatical correctness, and the complexity of sentence structures) and subjective metrics (e.g., metrics based on expert reviews, user ratings, or feedback from educators and students) for each reference material. Using these metrics, reference materials assessor 112, which may be a trained classification model, may output a quality level for each reference material. In some aspects, a quality level may be a quantitative value (e.g., a rating out of 10) or a qualitative value (e.g., "low," "medium," "high," etc.).

Reference materials assessor 112 of machine learning module 110 may also be configured to assign a difficulty level to each reference material in reference materials database 118. For example, a university level textbook on "biology" may be a high difficulty material, where as an elementary school textbook about "biology" may be a low difficulty material. Reference materials assessor 112 may define metrics such as complexity of sentence structures, word length, recommended age groups, target grade level, etc., for each reference material. Using these metrics, reference materials assessor 112, which may be a trained classification model, may output a difficulty level for each reference material. In some aspects, a difficulty level may be a quantitative value (e.g., a rating out of 10) or a qualitative value (e.g., "low," "medium," "high," etc.).

Course generator 102 stores reference materials and their respective quality levels and difficulty levels in reference materials database 118. It should be noted that prior to first use of course generator 102 for generating courses, the topics database 120 and reference materials database 118 needs include at least one topic and at least one reference material pertaining to the topic. A developer of course generator 102 may populate the software with multiple topics and reference materials for each topic. Afterwards, users can add topics and reference materials individually. In some aspects, topics database 120 and reference materials database 118 may be synchronized across multiple computing devices running course generator 102. For example, multiple schools or communities may share newly created topics and reference materials over a cloud database. As a result, any of a topic, reference material, course, etc., generated on one computing device may be transmitted by course generator 102 to a different computing device over a network (e.g., a local area network (LAN), a wide area network (WAN), etc.) for display on a GUI.

Suppose that a user launches course generator 102 on computing device 101*a* to generate a course 122 on GUI 106. In an exemplary aspect, GUI 106 receives input 104, which may include a topic and, in some aspects, any of a duration, a difficulty, and preferred reference materials. For example, the topic in input 104 may be "biology." Input request parser 108 may search for the topic in topics database 120. In response to finding a match, course generator 102 may output course 122 on GUI 106.

A course has several means of configuration including, but not limited to, the selection of topic, selection of sub-topics, selection of reference materials, selection of duration, selection of difficulty, glossary customization, etc. In some aspects, some configurations may be set on a course level (e.g., a duration or difficulty of an entire course) and some configurations may be set on a sub-topic level (e.g., a duration of a particular lesson on a sub-topic). In response to receiving a generic input (e.g., "biology"), course generator 102 may generate course 122 using default configurations (e.g., a default set of sub-topics, difficulty, duration, etc.). In some aspects, the default configurations may be set by course generator 102 based on user preferences. For example, when creating a user profile, the user may indicate that he/she is in the $12^{th}$ grade. Based on this information, course generator 102 may set the difficulty of a course to "high school" level, may set the duration to 170 hours (accounting for an hour per school day), and may use high school textbooks to generate course content.

In some aspects, course generator 102 may generate queries on GUI 106 to acquire more preferences by the user. For example, course generator 102 may generate a prompt that requests the user to select the sub-topics of interest (see FIG. 3). Course generator 102 may also generate panels that include configuration options (see FIG. 4A). For example, a user may be able to adjust the difficulty or duration of a course, while course generator 102 adjusts the content generated for a particular sub-topic.

In terms of course generation, syllabus generator 113 is configured to generate a structure of the course. Based on the selection of a topic, sub-topics, duration, difficulty, reference materials, etc., syllabus generator 113 outputs a plurality of course attributes. For example, the course attributes may indicate that the course has three sub-topics to be covered over nine hours on an intermediate difficulty. To achieve a nine hour duration, syllabus generator 113 allocates three hours for each sub-topic. To achieve three hours for each sub-topic, syllabus generator 113 limits a word limit of the content to 24000 (accounting for 200 word per minute reading speed), an assessment limit of 20 questions, and a media limit (e.g., a video) of 20 minutes. To achieve the difficulty constraints, reference materials matching the difficulty level are specified. For simplicity, all of these configurations are kept the same for each sub-topic in this example. However, a user may specify sub-topic level preferences, which may change these numbers. Furthermore, word limits may change based on the difficulty level as well as both duration and difficulty may affect each other. For example, at an elementary school level, the reading speed is significantly slower and comprehension skills are lower than at a university level. Accordingly, syllabus generator 113 may output lower word limits to accommodate.

In order to produce accurate structures, machine learning module 110 trains syllabus generator 113, which may be a regression model, using a training dataset that includes several input vectors and corresponding output vectors. The input vectors may each include user preference fields such as topic, sub-topic count, duration, difficulty, sub-topic level preferences, etc. The corresponding output vectors may each include course attribute fields with the ideal word limits, media limits, question limits, etc., per sub-topic. By training syllabus generator 113 to generate the output vectors based on the input vectors, syllabus generator 113 is able to recommend a plurality of course attributes for any set of course configurations provided in input 104.

Content generator 114 receives the course attributes and generates content for each sub-topic. In particular, the content comprises a summary, graphics, media, assessments (e.g., questions, projects, etc.), and recommended supplemental readings generated using one or more reference materials.

Generating summaries from multiple reference materials in reference materials database 118 using machine learning involves leveraging natural language processing (NLP) and text summarization techniques. In an exemplary aspect, content generator 114 may perform tokenization on each of the reference materials above a threshold quality level and that match a difficulty level preferred/specified by the user. Content generator 114 converts the tokenized text into numerical representations using techniques like Term Frequency-Inverse Document Frequency (TF-IDF) or word embeddings (e.g., Word2Vec, GloVe). This step captures the semantic meaning of words. In some aspects, content generator 114 may employ one or both of abstractive and extractive summarization approaches. Abstractive summarization involves generating new sentences to convey the summary, while extractive summarization selects and rearranges existing sentences.

In a supervised learning approach, content generator 114 is trained on labeled data with summaries corresponding to the reference materials. Accordingly, content generator 114 learns the relationship between the content and its corresponding summary. In an unsupervised learning approach, content generator 114 may use graph-based methods (e.g., TextRank) or clustering algorithms to identify and select the most important sentences. The length of the summary is bound to the course attribute indicated by syllabus generator 113. For example, if the word limit is 24000, the summary will include sentences extracted and/or abstracted from the reference materials that include no more than 24000 words. Because the reference materials are filtered based on quality and difficulty, content generator 114 generates tailored summaries for the user.

In an exemplary aspect, when selecting the sentences to include in the summary, content generator 114 refers to the glossary in topics database 120—specifically the glossary terms corresponding to a particular sub-topic. The weights of the words indicate which words are more important than others. Thus, the sentences extracted from reference material are likely to include words with higher weights. Likewise, self-generated sentences are likely to include words with higher weights. In some aspects, a user may access the glossary and adjust weights. In fact, a user may opt to add words and remove words depending on their learning preferences.

In some aspects, the extracted sentences from the reference materials may include mentions of graphics. For example, a textbook passage may refer to a textbook image. Accordingly, content generator 114 includes the mentioned graphic in the generated content. In another example, a website may include a link to a video on a video streaming website. Accordingly, content generator 114 includes the link to the video in the generated content.

Assessment generator 116 is configured to generate one or more of questions, short quizzes, tests, lab projects, etc., based on the generated content. For example, assessment generator 116 may be a generative neural network that receives the summary generated by content generator 114 and creates questions with answers found in the summary. If the summary says "the mitochondria is an organelle in which respiration and energy production occur," assessment generator 116 may generate the question "which organelle is responsible for respiration and energy production?". In some aspects, assessment generator 116 may identify questions found in the reference materials associated with the subtopic. For example, if the summary includes information about the mitochondria, assessment generator 116 may identify a question in the reference material about the mitochondria. In some aspects, assessment generator 116 compares the sentences in the summary to the sentences in the questions. Based on a correspondence, assessment generator 116 determines whether the question is a candidate for inclusion in the generated content. It should be noted that the number of questions or types of assessments produced by assessment generator 116 is indicated in the course attributes generated by syllabus generator 113. In some aspects, the assessments generated by assessment generator 116 are independent from the course and its content. For example, assessments may be separately generated and re-generated (with the same content of the course) made in accordance with learning objectives of the course. In some aspects, an assessment does not only evaluate comprehension of sub-topics; the assessment may evaluate general understanding of the course as a whole.

In some aspects, course generator 102 is equipped with sophisticated feedback algorithms that actively monitor student progress and adapt the generated content in real-time. The feedback algorithms recognize areas where students excel or struggle (e.g., like in differentiating between their grasp on derivatives and integrals in calculus). Based on this insight, course generator 102 may proactively offer supplementary modules, interactive tutoring sessions, or even adjust the main course content to better suit the student's learning pace and style. These real-time adjustments are powered by an intricate analysis of student performance, feedback, and learning patterns—ensuring that each student's learning journey is as effective and personalized as possible.

In general, machine learning module 110 may comprise one or more machine learning algorithms, which can broadly be categorized into three main types: supervised learning, unsupervised learning, and reinforcement learning.

Supervised learning is effective for tasks such as classification (assigning inputs to predefined categories) and regression (predicting continuous values). It relies on the availability of labeled data for both training and evaluation phases. In supervised learning, machine learning module 110 trains the algorithm on a labeled dataset, where each input has a corresponding output. The goal is to learn a mapping function from inputs to outputs, allowing the algorithm to make predictions or classifications on new, unseen data. The process typically involves the following steps: training, model building, prediction, feedback, and adjustment. In the training phase, machine learning module 110 provides the algorithm with a training dataset including input-output pairs. The algorithm learns the mapping function that relates inputs to outputs through an iterative process, adjusting its internal parameters based on the provided examples. During model building, the algorithm creates a model that can generalize from the training data to make predictions on new, unseen data. The model's complexity varies based on the algorithm used. For example, the model may be a simple linear regression model or a complex neural network. During the prediction phase, machine learning module 110 inputs test inputs (i.e., inputs with known outputs) into the model, which generates predictions or classifications based on what it has learned during training. The accuracy of predictions is evaluated by comparing them to the known outputs in a validation or test dataset. During the feedback and adjustment phase, machine learning module 110 refines the model based on feedback from its predictions. If the predictions differ from the actual outputs, the algorithm adjusts its internal parameters to minimize the errors. The performance of the trained model is assessed using metrics such as accuracy, precision, recall, etc., depending on the nature of the problem.

Unsupervised learning is valuable for tasks where the goal is to explore the inherent structure of the data, identify hidden patterns, or pre-process data for further analysis. It doesn't require labeled examples but relies on the algorithm's ability to discern meaningful structures within the input data. Unsupervised learning deals with unlabeled data, aiming to discover patterns, structures, or relationships within the dataset. Clustering and dimensionality reduction are common tasks in unsupervised learning, helping to reveal inherent structures without predefined target labels. The typical process for unsupervised learning includes: data collection, analysis (e.g., using clustering, dimensionality reduction, etc.) and association. For example, machine learning module 110 receives a dataset including only input features without corresponding output labels. Machine learning module 110 then performs exploratory data analysis to understand the inherent structure of the data. Common techniques in this analysis include statistical measures, clustering, and dimensionality reduction. For example, in clustering, the algorithm groups similar data points together based on certain features. Algorithms including, but not limited to, k-means clustering and hierarchical clustering are commonly used for grouping. In dimensionality reduction, the algorithm reduces the number of input features while retaining essential information. For example, the algorithm may use techniques like Principal Component Analysis (PCA) or t-distributed Stochastic Neighbor Embedding (t-SNE) for dimensionality reduction. During the association phase, the algorithm discovers relationships or associations between variables in the analyzed data. In some aspects, unsupervised learning is used in generative neural networks (e.g., generative adversarial networks (GANs)) to generate new data points similar to the existing dataset once the characteristics of the existing dataset are learned.

Reinforcement learning is applied in scenarios where the optimal decision-making strategy is learned through trial and error, without explicit guidance. It finds applications in various domains, including robotics, game playing, and autonomous systems. More specifically, reinforcement learning involves an agent learning to make decisions by interacting with an environment. The agent receives feedback in the form of rewards or penalties based on its actions, allowing it to learn optimal strategies through trial and error. The primary components of reinforcement learning are as follows: agent, environment, state, action, reward, exploration and exploitation, learning policy, and value function. An agent is the entity that takes actions in the environment. It's the learner in the system. The environment is the external system with which the agent interacts. It provides feedback to the agent based on the actions taken. The state is a representation of the current situation or configuration of the environment. Actions are the moves or decisions that the agent can take within the environment. A reward is a numerical signal that indicates the immediate benefit or cost of the agent's action. The agent's objective is to maximize the cumulative reward over time. The reinforcement learning process typically involves the following steps. The agent explores the environment to discover the most rewarding actions (exploration) and exploits its current knowledge to take actions it believes will yield the highest cumulative reward (exploitation). The agent learns a policy, which is a strategy that maps states to actions, based on the observed rewards and its exploration-exploitation trade-offs. The agent may also learn a value function, estimating the expected cumulative reward from a given state or state-action pair.

In machine learning, training involves optimizing the model's parameters to minimize a chosen objective function, often a loss function. Some training formulas and concepts that machine learning module 110 may execute include linear regression loss, logistic regression loss, reinforcement learning, and neural network loss.

For linear regression, Mean Squared Error (MSE) is a common loss function.

$$MSE = \frac{1}{n}\sum_{i=1}^{n}(y_i - \hat{y}_i)^2,$$

where yi is the true output, y^i is the predicted output, and n is the number of samples.

For binary classification in logistic regression, the Binary Cross-Entropy Loss is frequently used.

$$\text{Binary Cross–Entropy} = -\frac{1}{n}\sum_{i=1}^{n}[y_i \log(\hat{y}_i) + (1 - y_i)\log(1 - \hat{y}_i)],$$

where yi is the true label (0 or 1), y^i is the predicted probability, and n is the number of samples.

In neural networks, the cross-entropy loss is common for classification tasks. Cross–

$$\text{Entropy} = -\frac{1}{n}\sum_{i=1}^{n}\sum_{j=1}^{C} y_{ij}\log(\hat{y}_{ij}),$$

where yij is the true probability of class j, y^ij is the predicted probability, n is the number of samples, and C is the number of classes.

In reinforcement learning, the objective is often to maximize the expected cumulative reward. The Q-learning update rule is an example:

$$Q(s, a) \leftarrow Q(s, a) + \alpha[r + \gamma \max_{a'} Q(s', a') - Q(s, a)],$$

where Q(s,a) is the action-value function, α is the learning rate, r is the immediate reward, γ is the discount factor, s' is the next state, and a' is the next action.

These formulas represent the core optimization objectives in different machine learning scenarios, and the choice depends on the specific task and model architecture.

Machine learning module 110 may comprise one or more neural networks, which are a class of machine learning models inspired by the structure and functioning of the human brain. They consist of interconnected nodes, called neurons or artificial neurons, organized into layers. Neural networks are capable of learning complex patterns and representations from data. The neural network executed by machine learning module 110 may be one of the following: a feedforward neural network (FNN), convolution neural network (CNN), recurrent neural network (RNN), long short-term memory (LSTM) network, gated recurrent unit (GRU) network, autoencoder, generative adversarial network (GAN).

An FNN is the simplest form of neural network, where information travels in one direction—from the input layer through hidden layers to the output layer. An FNN is commonly used for tasks like classification and regression.

A CNN is specialized for processing grid-like data, such as images, and employs convolutional layers to learn spatial hierarchies of features, reducing the need for manual feature engineering. CNNs are well-suited for tasks like image classification, object detection, and image generation.

An RNN is designed for sequential data, where the order of inputs matters. An RNN includes loops in the network architecture to allow information to persist, and is useful for tasks like natural language processing, speech recognition, and time-series prediction.

A LSTM network is an extension of an RNN designed to overcome the vanishing gradient problem. LSTMs have memory cells that can store and retrieve information over long sequences, making them effective for capturing long-term dependencies in sequential data.

A GRU Network is similar to LSTMs and are another type of RNN with mechanisms to address the vanishing gradient problem. GRUs have a simpler architecture with fewer parameters compared to LSTMs.

An autoencoder is a type of neural network used for unsupervised learning and dimensionality reduction, and consists of an encoder that compresses input data into a lower-dimensional representation (encoding) and a decoder that reconstructs the original input from the encoding.

A GAN comprises a generator and a discriminator trained simultaneously through adversarial training. The generator aims to generate realistic data, while the discriminator tries to distinguish between real and generated data. A GAN is widely used for image and content generation tasks.

Figure 2A:
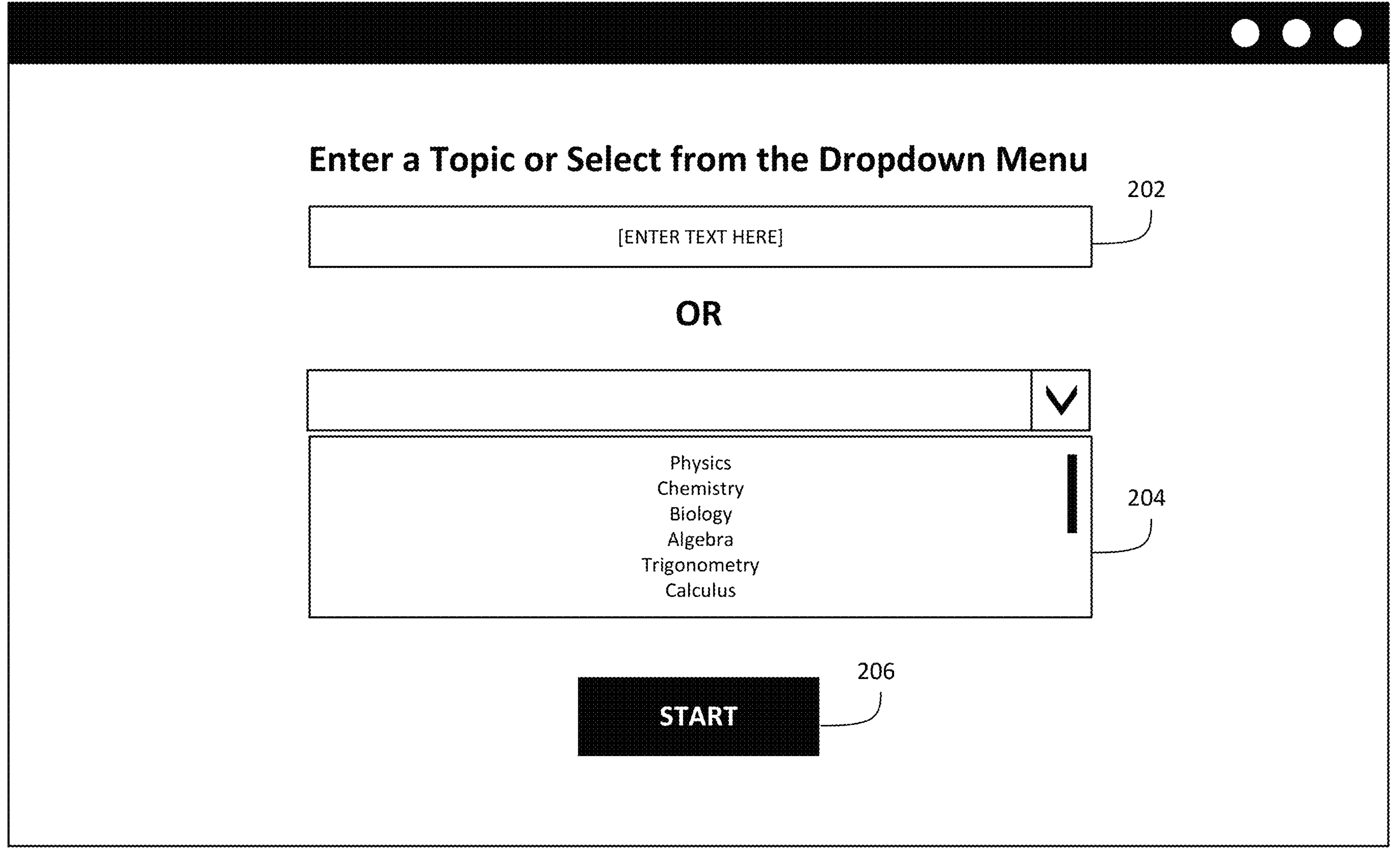
FIG. 2A is a diagram illustrating a GUI accepting a topic selection.

FIG. 2A is a diagram illustrating a GUI accepting a topic selection. The GUI in FIG. 2A corresponds to GUI 106 generated on computing device 101*a*. GUI 106 (as shown in FIG. 2A) displays text stating "enter a topic or select from the dropdown menu" and provides two input options right below. GUI 106 may receive a text input in textbox 202 (e.g., the user may enter the text "Biology") or may receive a selection from the plurality of topics listed in menu 204 (e.g., the user may scroll through the menu and select "Biology"). GUI 106 receives confirmation of the selection via the selection of the "start" button 206.

Figure 2B:
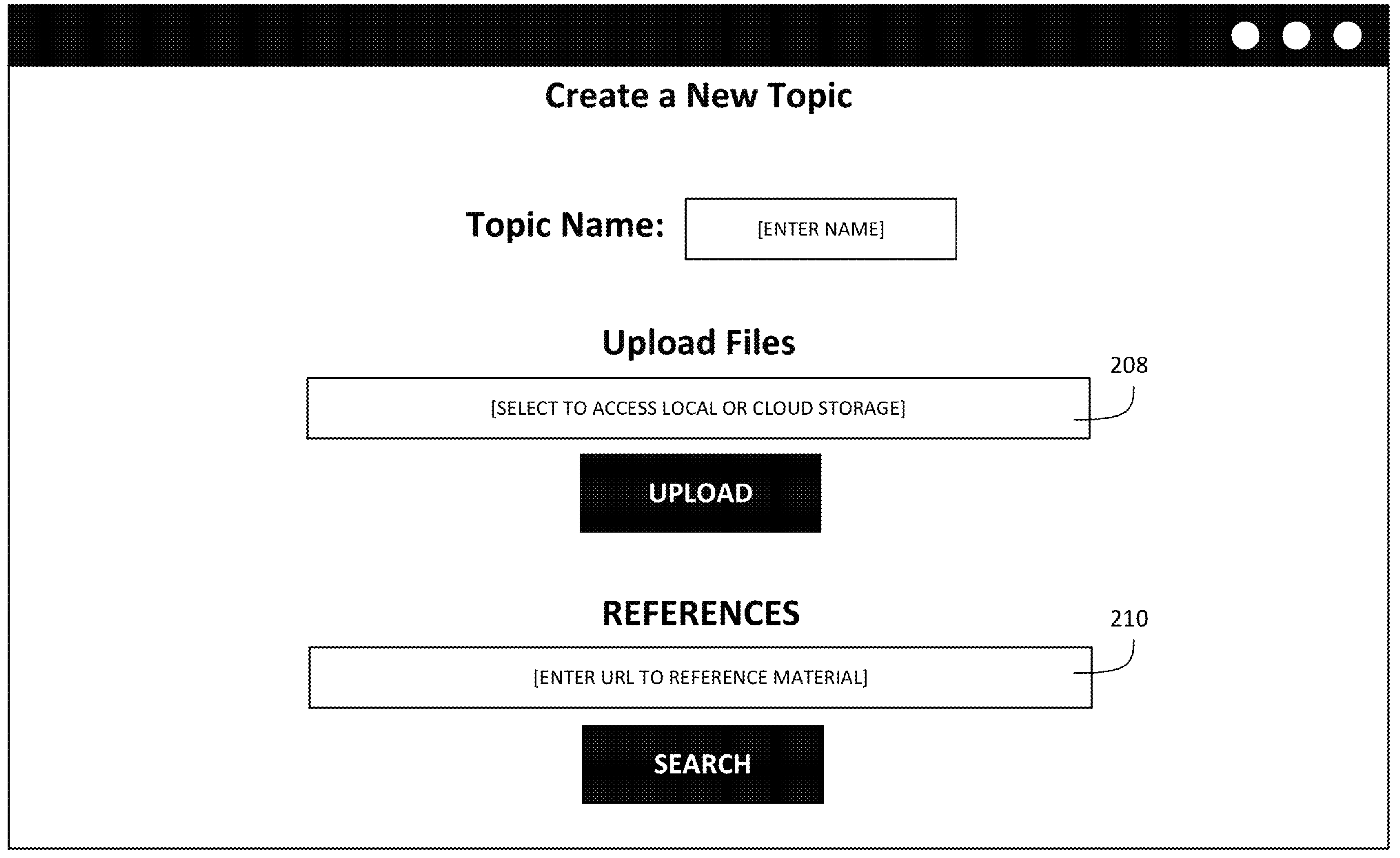
FIG. 2B is a diagram illustrating a GUI accepting reference materials for a new topic.

FIG. 2B is a diagram illustrating a GUI accepting reference materials for a new topic. GUI 106 (as shown in FIG. 2B) displays text stating "create a new topic," and provides field 208 where a user may upload reference materials. For example, GUI 106 may receive a collection of slide deck(s), text document(s), graphic(s), etc., that are uploaded by the user from a local storage (e.g., a local hard drive) or a cloud storage (e.g., an online data storage service). Additionally or alternatively, the user may provide Internet-based links (e.g., URL) to said references via field 210.

Figure 3:
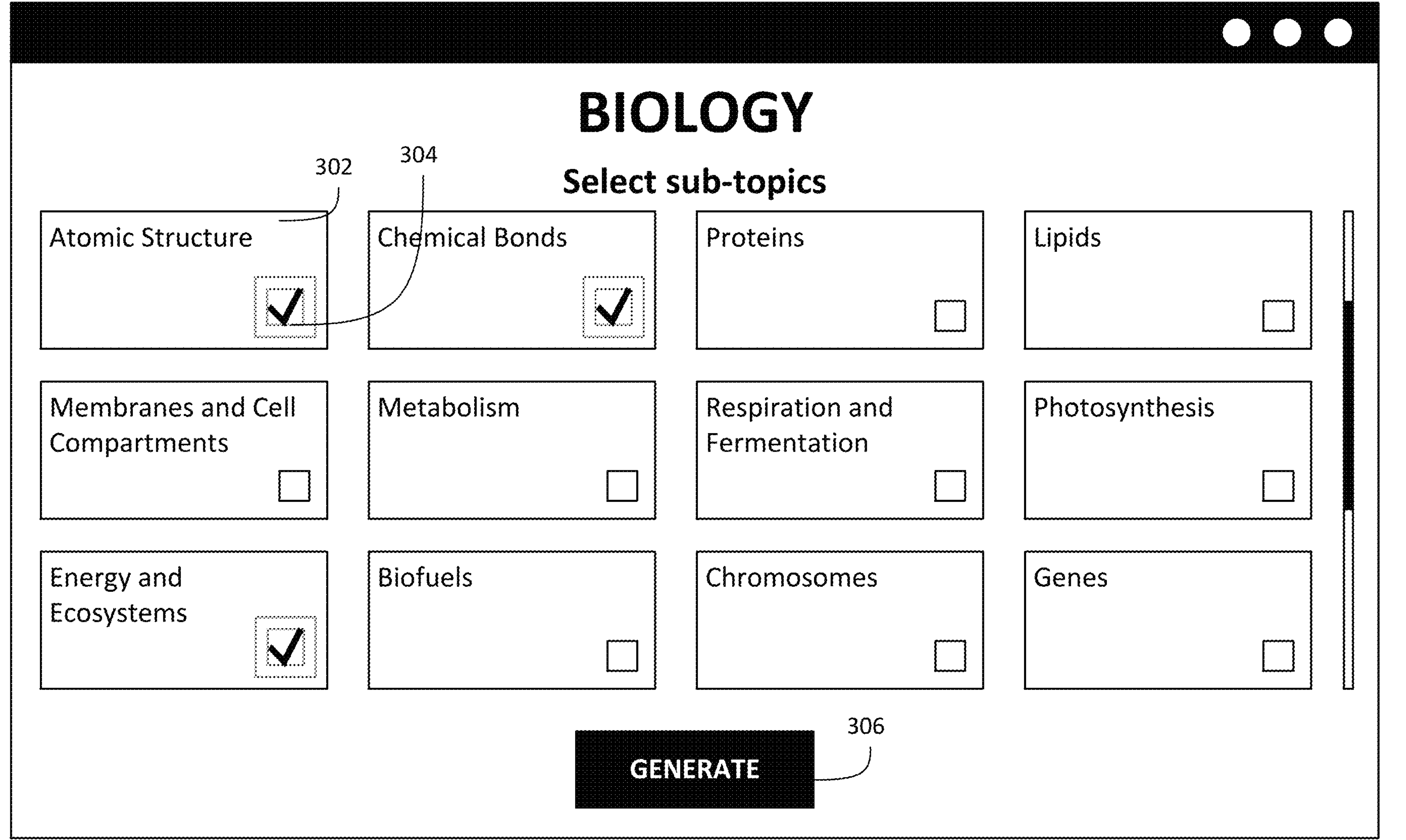
FIG. 3 is a diagram illustrating the GUI accepting sub-topic selections.

FIG. 3 is a diagram illustrating the GUI accepting sub-topic selections. GUI 106 (as shown in FIG. 3) generates a plurality of sub-topics to include from the selected topic. For example, if GUI 106 receives a selection of "biology," reference materials assessor 112 may extract the corresponding sub-topics from topics database 120. In FIG. 3, examples of sub-topics include "atomic structure," "chemical bonds," "proteins," "lipids," etc. Each sub-topic may be listed in a dropdown menu or as a table with multiple selectable elements. For example, in FIG. 3, GUI 106 presents the sub-topics as elements such as element 302 that includes a selection indicator 304. When the user selects a selection indicator 304 for a particular element, a graphic indicative of selection may be generated (e.g., a checkmark in the checkbox). After the user is satisfied with his/her selection(s), the user may select the "generate" button 306 to confirm the selection.

Figure 4A:
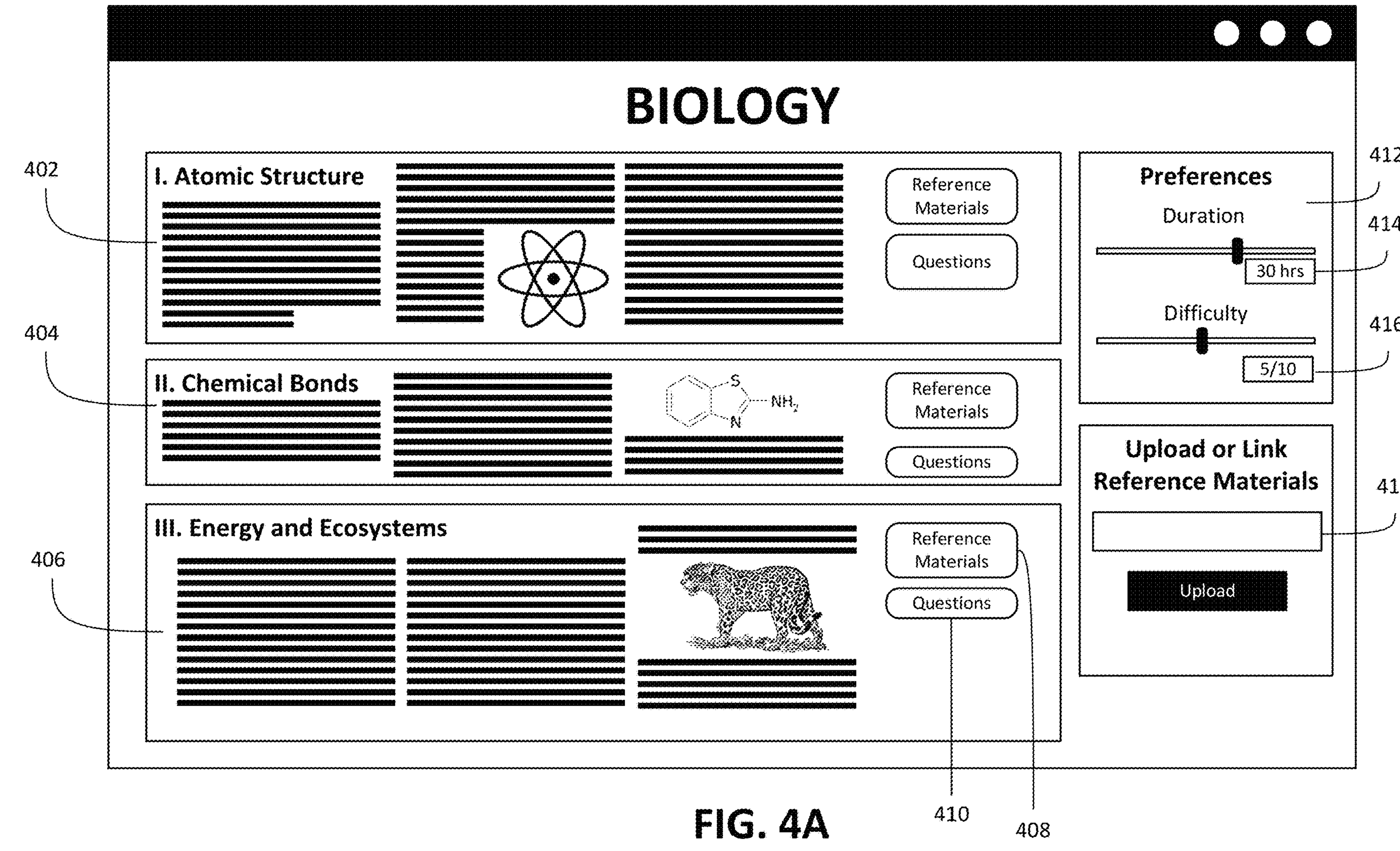
FIG. 4A is a diagram illustrating the GUI displaying a generated course.

FIG. 4A is a diagram illustrating the GUI displaying a generated course. Subsequent to receiving selections of the topic and sub-topic, GUI 106 generates a course that includes an initial syllabus and initial course content. For example, factors such as duration and difficulty may be default values such as 30 hours and 5/10, respectively. As shown in FIG. 4A, GUI 106 displays panels 402, 404, and 406. Each panel is ordered in the manner indicated by the generated syllabus (e.g., "atomic structure," followed by "chemical bonds," followed by "energy and ecosystems"). Each panel includes course content, which includes any combination of text, graphics (e.g., images, videos, animations, etc.), interactive plug-ins (e.g., games, etc.), etc., extracted from the reference materials associated with the sub-topics. Each panel further includes reference materials button 408, which allows a user to access the reference materials directly, and may indicate the portions that the user is recommended to read/view/listen to in the reference materials. For example, the user may review panel 406, which includes the course content generated by content generator 114. The user may then select reference materials button 408, which directs the user to a website that includes recommended supplemental material to learn more about the sub-topic. Likewise, GUI 106 may receive a selection of questions button 410, which results in an output of questions generated by assessment generator 116.

In an exemplary aspect, GUI 106 displays preferences panel 412, which allows the user to customize the course displayed on GUI 106. For example, a user may adjust the duration associated with the course by entering a duration value in duration adjuster 414 (e.g., the user may enter a text input or slide the slider). The user may also adjust the difficulty of the course by entering a difficulty value in difficulty adjuster 416. The effects of changing course duration are seen by comparing FIG. 4A and FIG. 4B. The effects of changing course difficulty are seen by comparing FIG. 4B and FIG. 4C.

Lastly, the user may upload the reference material that he/she would like to incorporate in the content generated by content generator 114. For example, the user upload a slide deck via panel 418. Accordingly, the text, graphics, etc., shown in the panels 402, 404, and 406 may dynamically change to incorporate the contents of the uploaded slide deck. Similarly, the user may provide an Internet-based link to the reference material via panel 418.

Figure 4B:
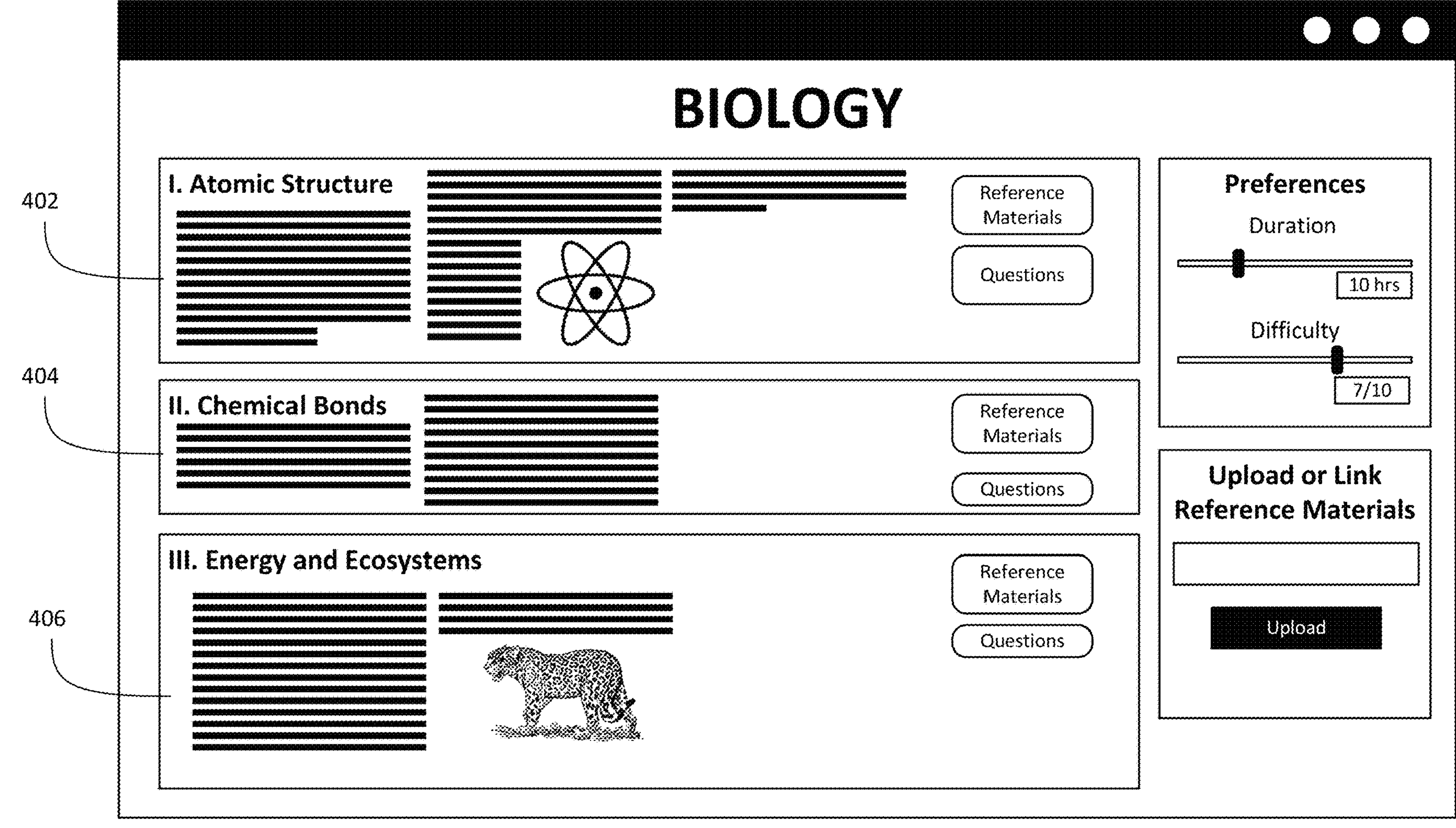
FIG. 4B is a diagram illustrating the GUI displaying an updated course based on a duration input.

FIG. 4B is a diagram illustrating the GUI displaying an updated course based on a duration input. As shown in FIG. 4A, GUI 106 displays the course comprising panels 402, 404, 406, and options for each panel via buttons such as buttons 408 and 410. As the user makes adjustments to the course using panels 412 and 418, GUI 106 is dynamically updated. In particular, data that is not relevant or does not accommodate the user's preferences is automatically hidden, whereas data that is relevant and accommodates the user's preferences is highlighted. In FIG. 4A, the duration of the course is set to 30 hours. In FIG. 4B, GUI 106 receives an adjustment that sets the duration to 10 hours. Accordingly, GUI 106 dynamically updates such that fewer text is shown. More specifically, the content from the references materials is summarized in a manner that fewer words are used to describe the sub-topic, fewer questions are included in assessments, and not as many reference materials are recommended. As a result, the user spends less time learning the information.

Figure 4C:
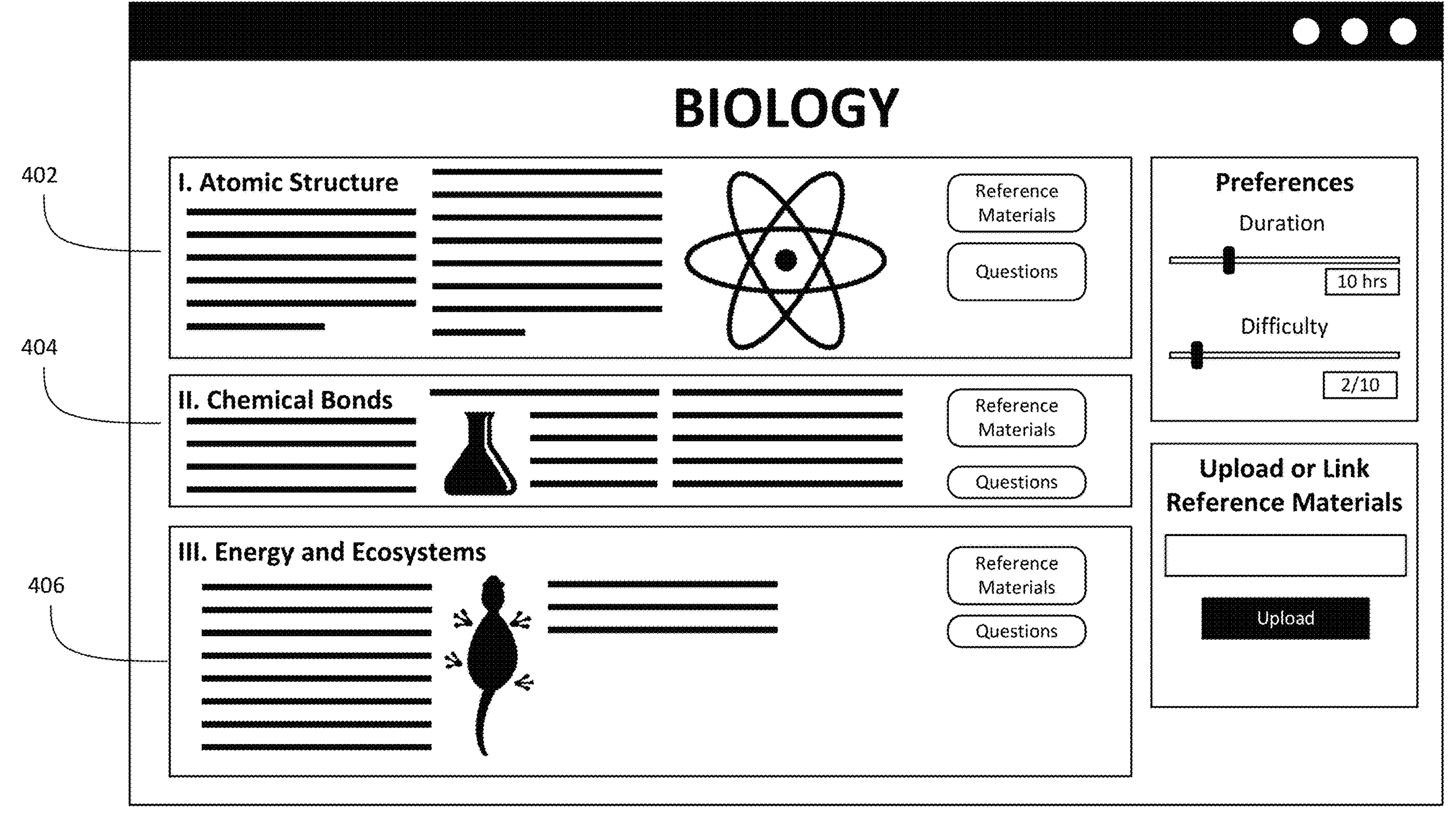
FIG. 4C is a diagram illustrating the GUI displaying an updated course based on a difficulty input.

FIG. 4C is a diagram illustrating the GUI displaying an updated course based on a difficulty input. For example, in FIG. 4B, the text is reduced and the sub-topic is summed in fewer words. However, the difficulty remains constant. In FIG. 4C, GUI 106 receives an adjustment that sets the difficulty from 5/10 to 2/10 (e.g., making it easier to understand). As shown in panels, 402, 404, and 406, even less text is used and the images are slightly different (e.g., more cartoon-like). The difficulty may be adjusted slightly by explaining concepts in layman terms with simpler words (e.g., using the word "hard" instead of "challenging"). Alternatively, the difficulty may be adjusted greatly by using different reference materials to generate the content (as shown in FIG. 4C). For example, instead of using a university-level textbook, GUI 106 may display content summarized from an elementary school textbook covering the same sub-topic.

Figure 5:
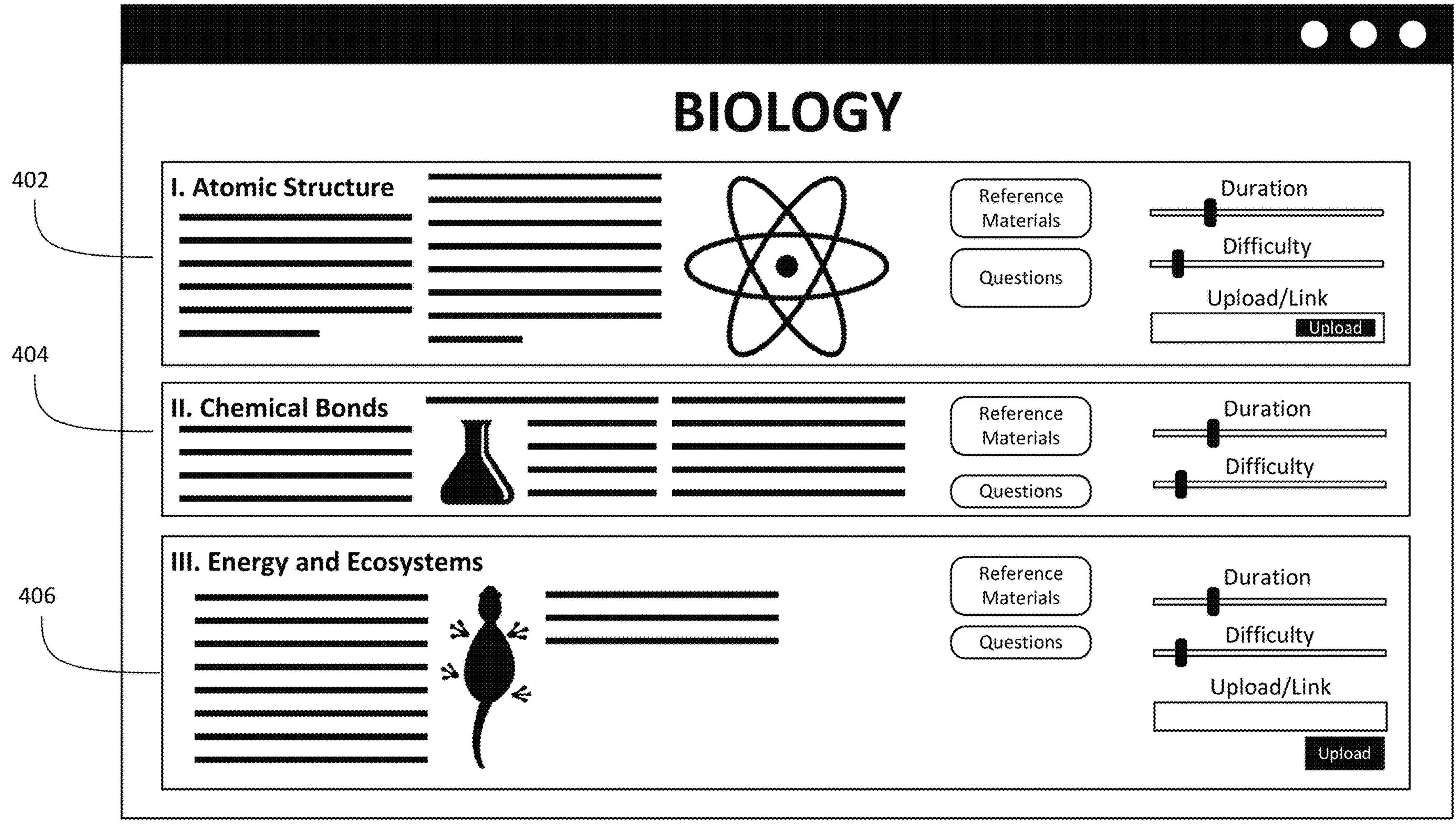
FIG. 5 illustrates a flow diagram of a method for generating custom courses on a graphical user interface using machine learning.

FIG. 5 is a diagram illustrating the GUI configuration options for the content generated for each sub-topic. As shown in FIG. 5, in each of panels 402, 404, 406, GUI 106 may display the options shown in panels 412 and 418. For example, the user may not be interested in adjusting the difficulty, reference materials, and/or duration of all courses globally, or may have preferences for each specific sub-topic. In some aspects, the user may indicate a particular difficult, duration, and/or reference material for each sub-topic, and GUI 106 may update the content automatically based on the selection. For example, the user may want to cover the topic of "atomic structure," in two hours on an easier difficulty because the user or a student of the user does not understand the subject as easily as other sub-topics. In contrast, the user may want to spend only 30 minutes learning about "energy and ecosystems," and is comfortable on an intermediate difficulty setting. The user may even upload specific reference materials for a specific sub-topic such as "energy and ecosystems," or may link an e-book and specify pages (e.g., a chapter associated with "energy and ecosystems") to extract/summarize information from.

Figure 6:
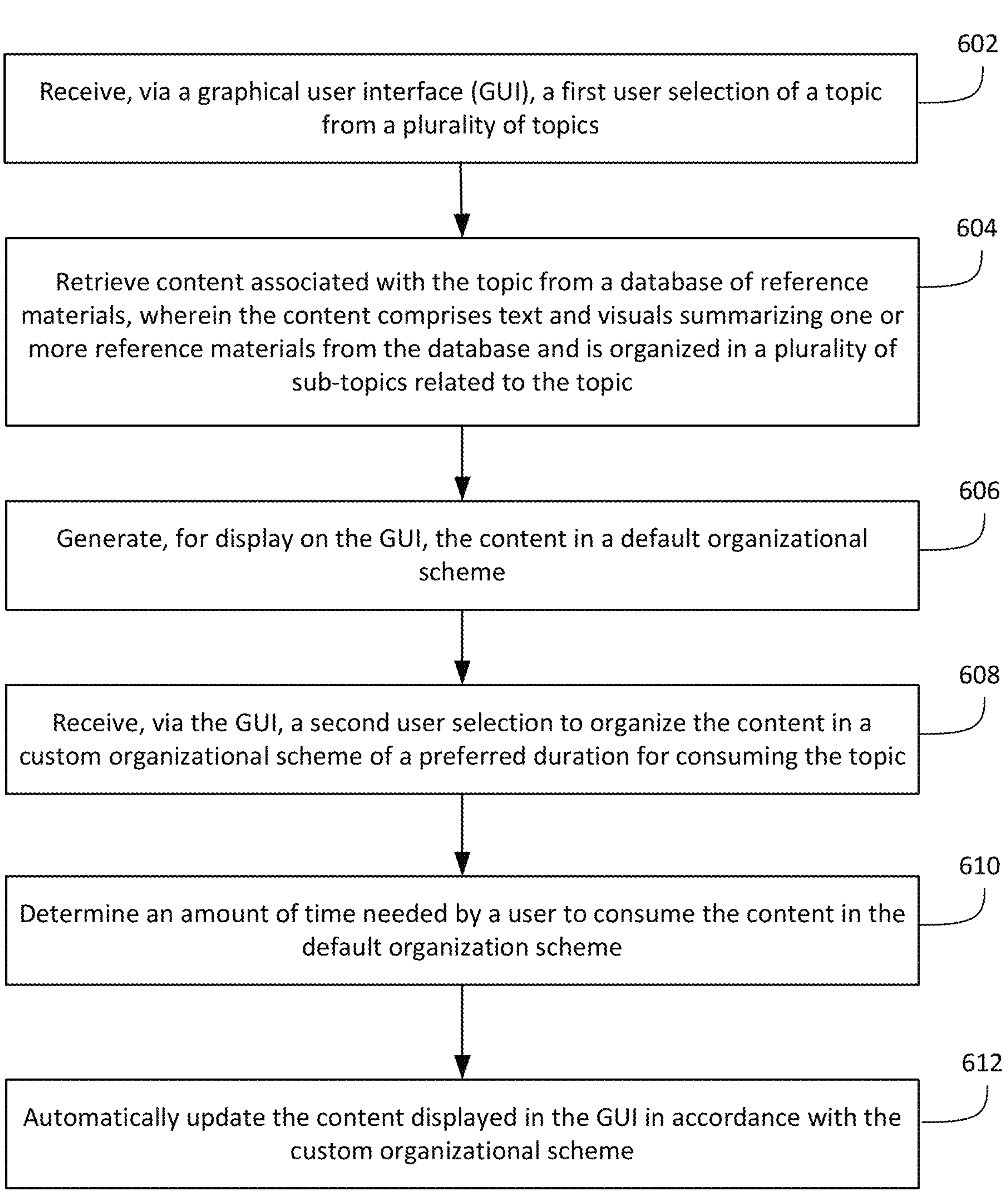
FIG. 6 is a block diagram illustrating a method for updating a GUI displaying content related to a topic based on user preference.

FIG. 6 is a block diagram illustrating method 600 for updating a GUI displaying content related to a topic based on user preference. At 602, course generator 102 receives, via GUI 106, a first user selection of a topic from a plurality of topics (as shown in FIG. 2A). At 604, content generator 114 retrieves content associated with the topic from a database of reference materials (e.g., reference materials database 118). The content includes text and visuals summarizing one or more reference materials from the database and is organized in a plurality of sub-topics related to the topic. In some aspects, the content is a course.

At 606, course generator 102 generates, for display on the GUI 106, the content in a default organizational scheme. In some aspects, an organizational scheme is a syllabus indicative of an order in which the plurality of sub-topics are presented, and an amount of text, graphics, and assessments for each sub-topic.

In some aspects, information of each sub-topic in the plurality of sub-topics is outputted in a different visual panel (e.g., panels 402, 404, and 406). In some aspects, a visual panel of a respective sub-topic includes options to adjust a duration and a difficulty level of the respective sub-topic. In some aspects, a visual panel of a respective sub-topic includes an option to provide a reference material from which information about the respective sub-topic is exclusively extracted. This is shown in FIG. 5.

At 608, course generator 102 receives, via the GUI 106, a second user selection to organize the content in a custom organizational scheme of a preferred duration for consuming the topic. For example, the user may enter, as shown in FIG. 4A, a duration value in duration adjuster 414 (e.g., the user may enter a text input or slide the slider).

At 610, course generator 102 determines an amount of time needed by a user to consume the content in the default organization scheme. For example, the default organization scheme may be have a default duration of 30 hours. This indicates that in order to complete the course, the user will need about 30 hours. This duration includes reading the text in the content, viewing the photos/videos, and completing the assessments, all of which may be required to consume the content in its entirety.

At 612, course generator 102 automatically updates the content displayed in the GUI in accordance with the custom organizational scheme. For example, course generator 102 may add additional content to the content when the amount of time is less than the preferred duration. In another example, course generator 102 may filter out existing content from the content when the amount of time is greater than the preferred duration. Suppose that the preferred duration is 10 hours. As shown in FIG. 4B, because the duration is less than the default duration, the amount of content shown in the panels 402, 404, and 406 decreases.

In some aspects, automatically updating the content displayed in the GUI in accordance with the custom organizational scheme involves executing a first machine learning algorithm trained to generate, for an input duration, a word limit of text in the content (e.g., where the limit may be based on a time of pronunciation of the assumed text of the materials), a media limit of graphics in content, and an assessment limit of questions in the content. Course generator 102 may then execute a second machine learning algorithm trained to summarize the one or more reference materials into the content comprising an updated amount of text capped at the word limit (e.g., an updated amount of text capped at the pronunciation limit), an updated amount of graphics capped at the media limit, and an updated amount of questions capped at the assessment limit.

In some aspects, course generator 102 receives, via the GUI 106, a third user selection to update the custom organizational scheme based on a preferred difficulty level for comprehending the topic. Course generator 102 determines a respective difficulty level of each reference material in the database. Course generator 102 further retrieves updated content from at least one reference material with a difficulty level that matches the preferred difficulty level. For example, if the preferred difficulty is the high school level and the current difficulty level in the default organizational scheme is university level, course generator 102 may select a high school textbook to generate the content. Course generator 102 may then automatically update the content displayed in the GUI 106 to the updated content in accordance with the custom organizational scheme.

In some aspects, course generator 102 receives, via the GUI 106, a fourth user selection to update the custom organizational scheme based on a preferred subset of sub-topics to include from a plurality of topics. For example, as shown in FIG. 3, course generator 102 may allow the user to select the sub-topics to include in the syllabus. In response, course generator 102 automatically updates the content displayed in the GUI 106 in accordance with the custom organizational scheme by filtering out the existing content from the content, wherein the existing content comprises information unrelated to the preferred subset of sub-topics. By filtering out information, the duration to complete the course may decrease. Accordingly, course generator 102 adds additional content to the content to match the preferred duration, wherein the additional content comprises information related to the preferred subset of sub-topics.

In some aspects, course generator 102 receives, via the GUI 106, a reference material or a link to the reference material to use for generating the content, and adds the reference material to the database, wherein the one or more reference materials comprise the reference material received via the GUI.

In some aspects, course generator 102 receives, via the GUI 106, a new topic that is not included in the plurality of topics and at least one reference material that describes the new topic. Course generator 102 parses the at least one reference material to identify a plurality of new sub-topics related to the new topic. Course generator 102 extracts, from the at least one reference material, information about each of the plurality of new sub-topics.

Course generator 102 of the present disclosure is an improvement in computer technology—particularly with regard to GUIs. A traditional user interface may display the content found in a reference material (e.g., generate a web page), but fails to limit the amount of information shown based on specific user preferences such as duration, difficulty, sub-topic preference, etc. Course generator 102 is configured to generate an improved GUI that presents information that is relevant to the user and automatically updates as the user's preferences are updated.

Figure 7:
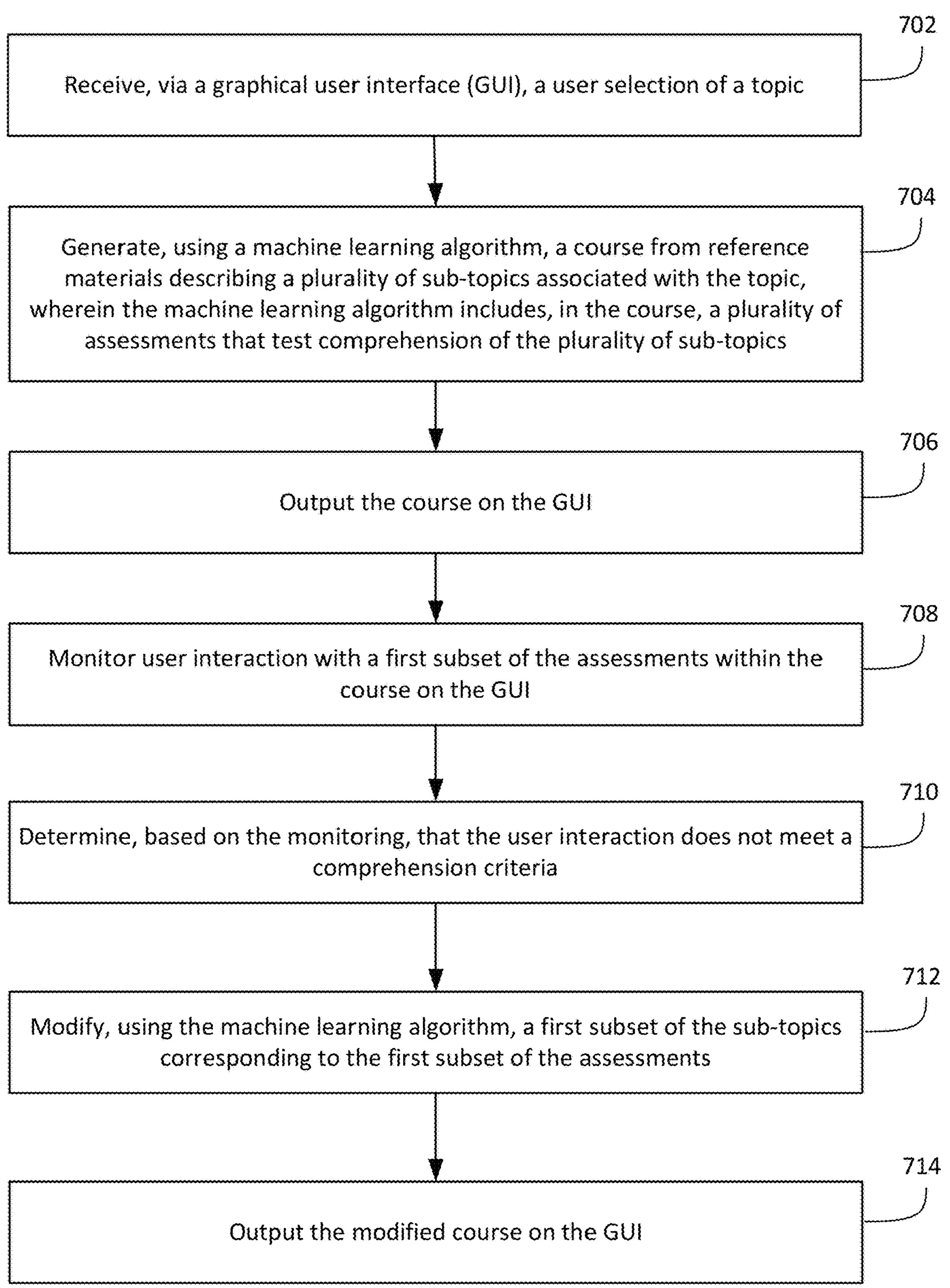
FIG. 7 is a block diagram illustrating a method for updating a graphical user interface displaying content related to a topic based on user performance.

FIG. 7 is a block diagram illustrating method 700 for updating a graphical user interface displaying content related to a topic based on user performance.

At 702, GUI 106 receives a user selection of a topic.

At 704, course generator 102 generates, using a model in machine learning module 110, a course from reference materials describing a plurality of sub-topics associated with the topic. In particular, assessment generator 116 of machine learning module 110 includes, in the course, a plurality of assessments that test comprehension of the plurality of sub-topics.

At 706, course generator 102 outputs the course on the GUI (e.g., GUI 124). Steps 702, 704, and 706 may be performed just as described previously (e.g., see FIG. 6). For example, course generator 102 retrieves content associated with the topic from a database of reference materials (e.g., database 118). Course generator 102 may then output the course on the GUI in a default organization scheme. Course generator 102 may further determine an amount of time needed by a user to consume the content in the default organization scheme. Course generator 102 may automatically update the content displayed in the GUI in accordance with a custom organizational scheme by (1) adding additional content to the content when the amount of time is less than a preferred duration indicated by the user, and (2) filtering out existing content from the content when the amount of time is greater than the preferred duration.

At 708, performance monitor 117 monitors user interaction with a first subset of the assessments within the course on the GUI. This user interaction may involve answering questions in an assessment. For example, a question may provide multiple answer choices from which the user may make a selection. In another example, the user may type/record in an answer in an input box visually below the question on the GUI. In another example, the user may submit an assignment/project of an assessment. One aspect of the user interaction is collected as clickstream data, although other aspects exist such as the value of inputs (e.g., if a user provides a graphic or text, said graphic/text is considered part of the user interaction).

Suppose that there are ten sub-topics and each sub-topic has one assessment. The first subset of the assessments may be one or more assessments (but not all assessments). For example, the first subset may be a preset value such as two. Accordingly, after two assessments have been completed, performance monitor 117 may evaluate whether the monitored user interface meets a comprehension criteria. The comprehension criteria may be derived from learning objectives. For example, a learning objective may be that the user needs to learn a particular sub-topic within a particular time frame. Because "learning" is a subjective term, comprehension criteria sets objective measures using attributes. In some aspects, performance monitor 117 may extract a plurality of attributes associated with the user interaction. For example, the plurality of attributes may include one or more of: student feedback, total score per assessment, scores per question type in an assessment, time spent to complete an assessment, time spent to provide a response within an assessment, and a number of attempts to provide the response, answer choice changes, time between answer choice changes, and uses of prompts/hits.

In some aspects, performance monitor 117 may use real-time information. For example, a sequence of pre-answer choices or corrections of the answer choice on the device may be used as an estimation of complexity and potential errors (which were/were not corrected after submission for a review). Likewise, the time between selections or key presses during pre-answer corrections may be used as well.

It is also possible that questions may have some prompts/tips on the screen (semi-hidden). The attributes may include whether the user accessed the prompts/tips (e.g., whether pre-answer choices were changed based on looking at the prompt, whether the tips were even seen, etc.).

In some aspects, the student feedback may be a written statement or completed survey by the student. For example, after each assessment, the user may be presented a survey via the GUI to describe the difficulty of the assessment. The survey may include preset answer choices such as "hard," "reasonable," "easy," etc. In addition or alternatively, the survey may include a question requiring a written answer describing the difficulty.

In terms of scores (used interchangeably with grades), the more favorable the score, the better the chances that the user is comprehending the course. For example, if the user achieves a 90% on an assessment, then it is possible that the user understood the content that was taught and later tested by the assessment.

In terms of time and number of attempts, the greater the time spent on a question, the less likely that the user is confident in his/her answers. Similarly, if the user keeps retrying a question in an assessment or retrying the assessment entirely, it is also less likely that the user understands the content.

In combination, the plurality of attributes make up an input vector that is provided to a machine learning algorithm (e.g., a classifier) that is trained to classify whether the comprehension criteria has been met based on the plurality of attributes. In some aspects, this machine learning algorithm is trained using a training dataset that includes vectors with historical/hypothetical attributes marked with labels ("satisfies" or "does not satisfy"). For example, a vector that satisfies the comprehension criteria (i.e., whether the user understands the taught material) may include student feedback (e.g., "reasonable"), score (e.g., 90%), scores per question type (e.g., multiple choice: 4/5, written answer: 5/5), time spent on assessment (e.g., 10 minutes), time spent on each question (e.g., question 1: 0.5 min, question 2: 0.5 min, etc.), and number of attempts on the assessment (e.g., 1). The training dataset may have several other examples through which the classifier is able to determine what the comprehension criteria is (as embodied by a plurality of learned weights).

In some aspects, an additional attribute of the plurality of attributes is a cheating probability. For example, performance monitor 117 may execute yet another machine learning algorithm configured to compare a student response to a database of responses to detect plagiarism. For example, if an assessment includes a question requiring a written response, performance monitor 117 may determine if any other student taking the course had the exact same answer or if the answer matches a text in a database of responses. The algorithm may further compare student scores to historical student scores to detect score anomalies. For example, a student may have a history of low scores on assessments and may suddenly have a score that is higher than usual. The machine learning algorithm may output a high cheating probability if there is such a jump in a score and answers provided by the student match or resemble answers in the database of responses. The cheating probability negatively impacts the comprehension criteria such that a high cheating probability will likely result in the comprehension criteria being unsatisfied (as determined by the machine learning algorithm configured to classify the comprehension criteria).

Performance monitor 117 may also detect cheating based on a behavioral pattern. Suppose that a student enters a wrong pre-answer choice (a non-finalized answer), pauses for a threshold period of time, and then changes his pre-answer choice to submit the correct answer choice. If performance monitor 117 detects this occurrence a threshold number of times (e.g., 7 times in a row), performance monitor 117 may determine that the student is potentially cheating.

At 710, performance monitor 117 determines, based on the monitoring, that the user interaction does not meet a comprehension criteria. For example, the input vector comprising the plurality of attributes of two completed assessments may have the average values from both assessments (e.g., average scores, average time spent, average number of attempts, etc.). Suppose that the user had generally low scores, high amount of time spent, etc. Performance monitor 117 may determine that the comprehension criteria is not satisfied.

At 712, performance monitor 117 modifies, using a machine learning algorithm, a first subset of the sub-topics corresponding to the first subset of the assessments. For example, performance monitor 117 may determine that the first two sub-topics associated with the two assessments is not adequately understood. This can be due to the student being lazy and not putting enough effort in the course, or due to a problem in the course itself. Performance monitor 117 may detect the former if the time spent on each sub-topic (e.g., 1 hour) is less than a threshold amount of time (e.g., at least 2 hours). Performance monitor 117 may detect the latter if the threshold amount of time is met, but the student still underperforms. Accordingly, performance monitor 117 may modify the course—particularly the first subset of sub-topics.

In one aspect, performance monitor 117 may add content from additional reference materials into the course, wherein the additional reference materials explain the first subset of the sub-topics. For example, if the first subset of sub-topics is generated using one textbook, performance monitor 117 may add supplemental content into the first subset of sub-topics using a different textbook. In some aspects, the different textbook may have a higher quality than the original textbook used. In some aspects, the content from the first reference material (e.g., the original textbook) may be replaced with the content from the additional reference material. The replaced content may have a lower difficulty than the original content, may include additional images, or may include additional text describing the first subset of sub-topics.

In some aspects, when modifying the first subset of the sub-topics, performance monitor 117 reduces, by a first amount, content associated with the first subset of the sub-topics from the course and adds, by the first amount, the alternative content to the course. For example, the first amount may be a first amount of words, characters, or sentences. Here, reducing the content comprises ranking text (e.g., using an algorithm such as TextRank) in the content associated with the first subset of the sub-topics and removing any text from the course with a rank less than a threshold text rank. This text is then replaced by text from the alternative content.

In some aspects, the alternative content may be taken from the same reference materials used to generate the first subset of sub-topics. For example, the alternative content may be a different set of figures taken from the same textbook that the original content was taken from. In this case, the alternative content elaborates on the first subset of the sub-topics.

In some aspects, when modifying the first subset of the sub-topics, performance monitor 117 replaces the first subset of the assessments with alternative assessments with a lower difficulty than the first subset of the assessments. For example, it is also possible that the user understands the sub-topics well, but the questions are simply too difficult. This scenario may be detected by performance monitor 117 if the course is modified and the assessment performance by the student still does not improve. Accordingly, performance monitor 117 may select easier questions from the reference material (questions may already be labelled in terms of difficulty). Alternatively, performance monitor 117 may using a large language model to simplify the language of questions or provide hints in future assessments.

In some aspects, performance monitor 117 may modify a second subset of the sub-topics that do not correspond to the first subset of the assessments. For example, in response to detecting low performance in the first two assessments, performance monitor 117 may modify one or more of the remaining eight assessments by making them easier or by adding additional/replacement content in the corresponding sub-topics. This is a proactive step taken to improve user experience and comprehension in the remainder of the course.

At 714, performance monitor 117 outputs the modified course on the GUI.

In some aspects, if a course is modified for one student, performance monitor 117 may generate the modified course for future students as well. For example, performance monitor 117 may store the modified version of the course as the default version in order to bypass the anticipated difficulties that other students may have and present a course where the difficulties and contents are vetted.

Figure 8:
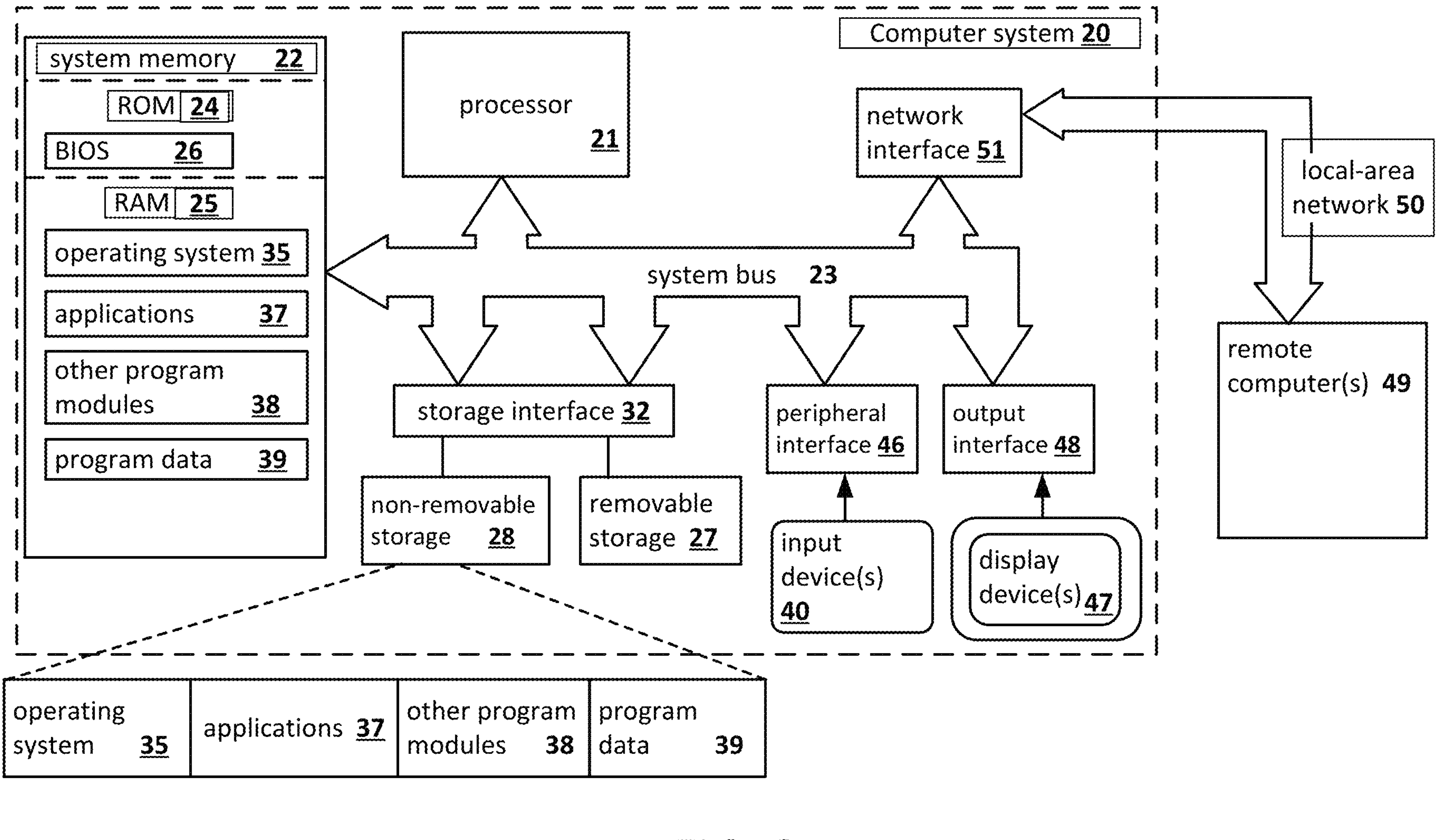
FIG. 8 presents an example of a general-purpose computer system on which aspects of the present disclosure can be implemented.
Figure 9:
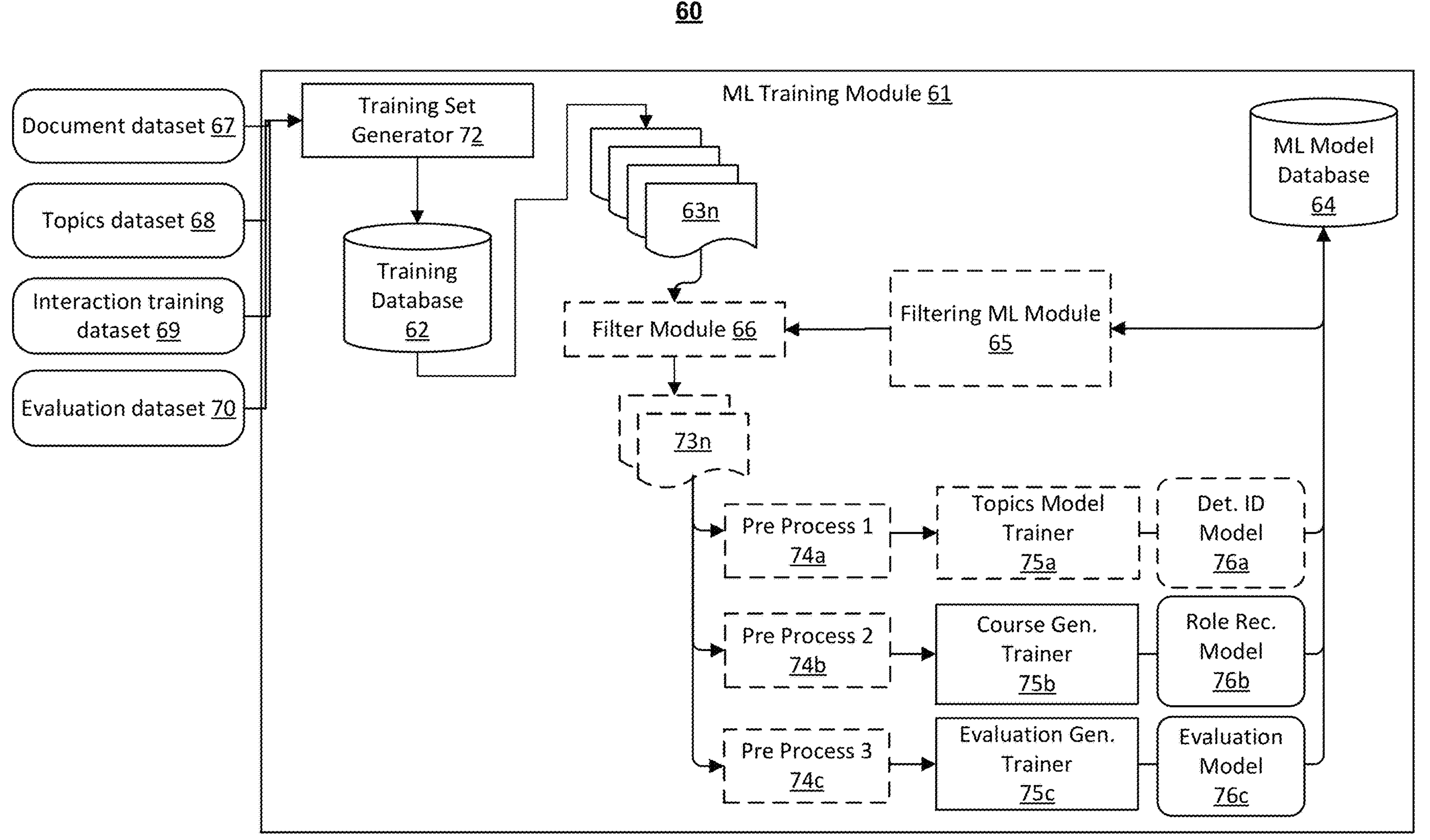
FIG. 9 is a block diagram illustrating a system for training course generator to generate custom courses according to aspects of the present disclosure.

FIG. 8 is a block diagram illustrating a computer system 20 on which aspects of systems and methods for generating custom courses on a graphical user interface using machine learning may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-7 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

FIG. 8 is a block diagram illustrating a system 60 for training course generator 102 to generate custom courses according to aspects of the present disclosure. As shown in example 60, a ML training module 61 is configured to build and train specialized machine learning models with inference to perform particular tasks. This enables the specialized machine learning models to develop an ability to perform particular objectives on inputs that are not part of a training dataset. By subjecting the specialized machine learning models to large amounts of unlabeled and/or labeled trained image data sets, the specialized machine learning models may perform particular tasks such as course generation.

Supervised learning is effective for tasks such as classification (assigning inputs to predefined categories) and regression (predicting continuous values) since it relies on the availability of labeled data for both training and evaluation phases. In supervised learning, the ML training module 61 trains the algorithm on a labeled dataset, where each input has a corresponding output. The goal is to learn a mapping function from inputs to outputs, allowing the algorithm to make predictions or classifications on new, unseen data. The process typically involves the following steps: training, model building, prediction, feedback, and adjustment. In the training phase, the ML training module 61 provides the algorithm with a training dataset including input-output pairs. The algorithm learns the mapping function that relates inputs to outputs through an iterative process, adjusting its internal parameters based on the provided examples. During model building, the algorithm creates a model that can generalize from the training data to make predictions on new, unseen data. The model's complexity varies based on the algorithm used. For example, the model may be a simple linear regression model or a complex neural network. During the prediction phase, the ML training module 61 inputs test inputs (i.e., inputs with known outputs) into the model, which generates predictions or classifications based on what it has learned during training. The accuracy of predictions is evaluated by comparing them to the known outputs in a validation or test dataset. During the feedback and adjustment phase, machine refines the model based on feedback from its predictions. If the predictions differ from the actual outputs, the algorithm adjusts its internal parameters to minimize the errors. The performance of the trained model is assessed using metrics such as accuracy, precision, recall, etc., depending on the nature of the problem.

In some aspects, the ML training module 61 includes at least a training database 62 configured to store the raw training data 63*n* and corresponding labels, a ML model database 64 to store the trained models (e.g., model 76*a*, 76*b*, 76*c*, etc.). In some aspects, the ML training module 61 may include a filtering machine learning model 65 and a filter module 66 configured to filter data from the training database 62 for training by removing poorly generated training data.

Training data from the document dataset 67, topics dataset 68, interaction training dataset 69, and evaluation dataset 70 is received into the ML training module 61 via the training set generator 72. In some aspects, document dataset 67 includes documents and summarized versions of said documents, topics dataset 68 includes text and identified topics in the text, interaction training dataset 69 includes clickstream user data on the UI, and evaluation dataset 70 including question and answer student performance.

An optional filter module 66 is configured to filter out bad training images and/or data in order to clean up the training data in the training dataset 63*n*. In some examples, the filter module 66 may be a neural network. In some examples, the filter module 66 is a mathematical model. In some examples, the cleaned training dataset 73*n* then undergoes optional preprocessing steps depending on which neural network or model is being trained.

The optional preprocess 1 74*a*, preprocess 2 74*b*, and preprocess 3 74*c* are automated processes that modify the raw data received from 63*n* (or cleaned training dataset 73*n*) and prepare the raw data as input to the respective model trainers (e.g., a people/object detection model trainer 75*a*, a role recognition model trainer 75*b*, and an evaluation model trainer). These may be described in the machine learning training module 61 as snippets of code that prepares the datasets. In some examples, the preprocessing module (e.g., preprocess 174*a*, preprocess 2 74*b*, and preprocess 3 74*c*) for a particular trainer may be an automated script or code that will be setup the first time any model is trained.

The topics model trainer 75*a*, course generation trainer 75*a*, and evaluation generation trainer 75*c* are the scripts or code that train the model. The topics model trainer 75*a*, course generation trainer 75*a*, and evaluation generation trainer 75*c* may be a script or code that holds the instructions on how a model should be trained (e.g., optimization method, model architecture, dataset division, etc.) and also runs the training. The topics model trainer 75*a*, course generation trainer 75*a*, and evaluation generation trainer 75*c* each take as input the raw or filtered processed training data and train topics model 76*a*, course generation model 76*b*, and evaluation generation model 76*c* to achieve their specific objectives, respectively.

In summary, the raw dataset 63*n* or cleaned dataset 73*n* may optionally go through different preprocessing steps 74*a*, 74*b*, and 74*c* and then a corresponding topics model trainer 75*a*, course generation trainer 75*a*, and evaluation generation trainer 75*c* to generate a trained model 76*a*, a trained course generation model 76*b*, and a trained evaluation generation model 76*c*. In some examples, each of these models may be a neural network.

As a non-limiting example, the machine learning may be a neural network. The neural network models are designed using a set of hyperparameters that define high-level aspects of their architecture and training process. These hyperparameters include, but are not limited to a combination of architecture type, number of layers, memory size, number of attention heads, learning rate, batch size, optimization algorithm, and the like. Based on these hyperparameters, learnable variables called parameters are initialized, which define the mathematical function that the neural network represents.

The raw training dataset 63*n* used for training may include noise and bad training images from the training database 62. Accordingly, to create a clean and filtered training dataset, the filter module 66 is configured to filter out unwanted data points from the raw training dataset 63*n* by developing smaller, less accurate systems based on patterns and metadata information.

During the training process, topics model trainer 75*a*, course generation trainer 75*a*, and evaluation generation trainer 75*c* (e.g., neural networks) are presented with input data and labels of actual values, and the optimization objective, which aims to minimize the difference between the actual value and the predicted value, is calculated. The optimization algorithm updates the parameters of topics model trainer 75*a*, course generation trainer 75*a*, and evaluation generation trainer 75*c* to reduce the value of the objective. This process is repeated for several iterations until the parameters do not change anymore. This process is repeated for various combinations of hyperparameters, and the model with the smallest label prediction error is selected as the final model.

When a new model (e.g., a trained topics model 76*a*, a trained course generation model 76*b*, and a trained evaluation generation model 76*c*) is created, and a new process for filtering and automated labeling is established, it is added to the ML model database 64 in the ML training module 61. This enables the new model to be part of the closed-loop model update process. Optionally, at regular intervals, data which is continuously collected can be filtered, labeled, and used to update old models by an optional filtering machine learning module 65. In some examples, the filtering machine learning module 65 is a neural network. In some examples, the filtering machine learning module 65 is a mathematical model. This approach may capture changes in the data over time.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine under-taking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for updating a user interface displaying content related to a topic based on user comprehension of the topic, the method comprising:

receiving, via the user interface (UI), a user selection of the topic;

generating, using a machine learning algorithm, a course from reference materials describing a plurality of sub-topics associated with the topic, wherein generating the course includes:

filtering the reference materials to select materials that meet a threshold quality level and a preferred difficulty level, executing an unsupervised machine learning model utilizing a graph-based or clustering algorithm to identify and extract selected sentences from the reference materials, capping the extracted selected sentences such that a total length of course content is bound to a word limit generated for the sub-topic, and generating a plurality of assessments that test comprehension of the plurality of sub-topics;

outputting the course on the UI;

monitoring, in real-time, user interaction with both a first subset of the assessments within the course on the UI and course content tested by the first subset of the assessments;

determining whether the user interaction meets a comprehension criterion by generating an input vector comprising a plurality of attributes associated with the user interaction and feeding the input vector into a machine learning classifier, wherein the machine learning classifier applies a plurality of learned weights to the input vector to output a classification of whether the user interaction meets the comprehension criterion, the plurality of learned weights being optimized by training the machine learning classifier on a training dataset comprising historical input vectors mapped to corresponding output labels indicating whether historical user interactions satisfy the comprehension criterion;

in response to determining that the user interaction does not meet the comprehension criterion;

automatically updating the course content displayed in the UI by executing at least one machine learning model configured, individually or in combination, to:

generate, for an input duration, a new word limit of text in the course content, a media limit of graphics in the course content, and an assessment limit of questions in the course content; and summarize the reference materials into the course content comprising an updated amount of text capped at the new word limit, an updated amount of graphics capped at the media limit, and an updated amount of questions capped at the assessment limit; and re-rendering the updated course content on the UI in real time.

2. The computer-implemented method of claim 1 further comprising, automatically updating the course content displayed in the UI in accordance with a custom organizational scheme by performing at least one of: selecting alternative content from the reference materials; or ranking text in the course content associated with a first subset of the sub-topics and removing lower-ranked text; and re-rendering the updated course content on the UI in real time.

3. The computer-implemented method of claim 1, wherein the plurality of attributes comprises one or more of: student feedback, total score per assessment, scores per question type in an assessment, time spent to complete an assessment, time spent to provide a response within an assessment, a number of attempts to provide the response, a number of answer choice changes, a time spent between each of the answer choice changes, and usage of prompts and hints.

4. The computer-implemented method of claim 1, wherein an attribute of the plurality of attributes is a cheating probability, further comprising:

executing a different machine learning algorithm configured to compare a student response to a database of responses to detect plagiarism, and compare student scores to historical student scores to detect score anomalies, wherein the different machine learning algorithm outputs the cheating probability.

5. The computer-implemented method of claim 1, wherein generating the course further comprises creating a document term matrix (DTM) representing a frequency of terms in the reference materials, applying a Latent Dirichlet Allocation (LDA) algorithm to the DTM to assign each of the reference materials a probability distribution over the plurality of sub-topics, and labeling the plurality of sub-topics based on the terms having a highest probability in the probability distribution.

6. The computer-implemented method of claim 1, wherein generating the course further comprises feeding an input vector comprising user preference fields into a regression model trained on a dataset of corresponding output vectors to generate a plurality of course attribute fields, the plurality of course attribute fields defining the word limit, the media limit, and the assessment limit for the sub-topics.

7. The computer-implemented method of claim 1, wherein generating the course further comprises performing tokenization on the filtered reference materials, and converting the tokenized text into numerical representations using Term Frequency-Inverse Document Frequency (TF-IDF) or word embeddings.

8. The computer-implemented method of claim 1, wherein monitoring, in real-time, user interaction with both a first subset of the assessments within the course on the UI and course content tested by the first subset of the assessments includes capturing clickstream data comprising a sequence of pre-answer choices and a time between key presses during pre-answer corrections on the UI.

9. The computer-implemented method of claim 8 further comprising, using the captured clickstream data to estimate complexity of an assessment and potential errors in the assessment.

10. The computer-implemented method of claim 1, wherein modifying the first subset of the sub-topics comprises:

replacing the first subset of the assessments with alternative assessments with a lower difficulty than the first subset of the assessments.

11. The computer-implemented method of claim 1, wherein generating the course further comprises:

retrieving content associated with the topic from a database of reference materials, wherein the content comprises text and visuals from the reference materials;

outputting the course on the UI in a default organization scheme;

determining an amount of time needed by a user to consume the content in the default organization scheme; and automatically updating the content displayed in the UI in accordance with a custom organizational scheme by:

adding additional content to the content when the amount of time is less than a preferred duration; and filtering out existing content from the content when the amount of time is greater than the preferred duration.

12. A system for updating a user interface displaying content related to a topic based on user comprehension of the topic, comprising:

at least one memory;

at least one hardware processor coupled with the at least one memory and configured, individually or in combination, to:

receive, via the user interface (UI), a user selection of the topic;

generate, using a machine learning algorithm, a course from reference materials describing a plurality of sub-topics associated with the topic, wherein generating the course includes:

filtering the reference materials to select materials that meet a threshold quality level and a preferred difficulty level, executing an unsupervised machine learning model utilizing a graph-based or clustering algorithm to identify and extract selected sentences from the reference materials, capping the extracted selected sentences such that a total length of course content is bound to a word limit generated for the sub-topic, and generating a plurality of assessments that test comprehension of the plurality of sub-topics;

output the course on the UI;

monitor, in real-time, user interaction with both a first subset of the assessments within the course on the UI and course content tested by the first subset of the assessments;

determine whether the user interaction meets a comprehension criterion by generating an input vector comprising a plurality of attributes associated with the user interaction and feeding the input vector into a machine learning classifier, wherein the machine learning classifier applies a plurality of learned weights to the input vector to output a classification of whether the user interaction meets the comprehension criterion, the plurality of learned weights being optimized by training the machine learning classifier on a training dataset comprising historical input vectors mapped to corresponding output labels indicating whether historical user interactions satisfy the comprehension criterion;

in response to determining that the user interaction does not meet the comprehension criterion;

automatically update the course content displayed in the UI by executing at least one machine learning model configured, individually or in combination, to:

generate, for an input duration, a new word limit of text in the course content, a media limit of graphics in the course content, and an assessment limit of questions in the course content; and summarize the reference materials into the course content comprising an updated amount of text capped at the new word limit, an updated amount of graphics capped at the media limit, and an updated amount of questions capped at the assessment limit; and re-render the updated course content on the UI in real time.

13. The system of claim 12, wherein the at least one hardware processor is configured to automatically update the content displayed in the UI in accordance with a custom organizational scheme by performing at least one of: summarizing reference materials into the content; selecting alternative content from the reference materials; or ranking text in the content associated with the first subset of the sub-topics and removing lower-ranked text; and re-render the updated content on the UI in real time.

14. The system of claim 13, wherein generating the course further comprises creating a document term matrix (DTM) representing a frequency of terms in the reference materials, applying a Latent Dirichlet Allocation (LDA) algorithm to the DTM to assign each of the reference materials a probability distribution over the plurality of sub-topics, and labeling the plurality of sub-topics based on the terms having a highest probability in the probability distribution.

15. The system of claim 13, wherein generating the course further comprises feeding an input vector comprising user preference fields into a regression model trained on a dataset of corresponding output vectors to generate a plurality of course attribute fields, the plurality of course attribute fields defining the word limit, the media limit, and the assessment limit for the sub-topics.

16. The system of claim 12, wherein generating the course further comprises performing tokenization on the filtered reference materials, and converting the tokenized text into numerical representations using Term Frequency-Inverse Document Frequency (TF-IDF) or word embeddings.

17. The system of claim 12, wherein monitoring, in real-time, user interaction with both a first subset of the assessments within the course on the UI and course content tested by the first subset of the assessments includes capturing clickstream data comprising a sequence of pre-answer choices and a time between key presses during pre-answer corrections on the UI.

18. The system of claim 12, wherein using the captured clickstream data to estimate complexity of an assessment and potential errors in the assessment.

19. A non-transitory computer readable medium storing thereon computer executable instructions for updating a user interface displaying content related to a topic based on user comprehension of the topic, including instructions for:

receiving, via the user interface (UI), a user selection of the topic;

generating, using a machine learning algorithm, a course from reference materials describing a plurality of sub-topics associated with the topic, wherein generating the course includes:

filtering the reference materials to select materials that meet a threshold quality level and a preferred difficulty level, executing an unsupervised machine learning model utilizing a graph-based or clustering algorithm to identify and extract selected sentences from the reference materials, capping the extracted selected sentences such that a total length of course content is bound to a word limit generated for the sub-topic, and generating a plurality of assessments that test comprehension of the plurality of sub-topics;

outputting the course on the UI;

monitoring, in real-time, user interaction with both a first subset of the assessments within the course on the UI and course content tested by the first subset of the assessments;

determining whether the user interaction meets a comprehension criterion by generating an input vector comprising a plurality of attributes associated with the user interaction and feeding the input vector into a machine learning classifier, wherein the machine learning classifier applies a plurality of learned weights to the input vector to output a classification of whether the user interaction meets the comprehension criterion, the plurality of learned weights being optimized by training the machine learning classifier on a training dataset comprising historical input vectors mapped to corresponding output labels indicating whether historical user interactions satisfy the comprehension criterion;

in response to determining that the user interaction does not meet the comprehension criterion;

automatically updating the course content displayed in the UI by executing at least one machine learning model configured, individually or in combination, to:

generate, for an input duration, a new word limit of text in the course content, a media limit of graphics in the course content, and an assessment limit of questions in the course content; and summarize the reference materials into the course content comprising an updated amount of text capped at the new word limit, an updated amount of graphics capped at the media limit, and an updated amount of questions capped at the assessment limit; and re-rendering the updated course content on the UI in real time.

20. The method of claim 1, wherein the at least one machine learning model is trained on a training dataset comprising input vectors indicative of target durations and corresponding output vectors indicative of word, media, and assessment limits.

* * * * *